United States Patent
Lim et al.

(10) Patent No.: US 10,147,926 B1
(45) Date of Patent: Dec. 4, 2018

(54) BATTERY PACKAGE INCLUDING ELECTRODE HAVING RECESSED REGION OF ELECTRODE MATERIAL LAYER EXPOSING A PORTION OF A CONDUCTIVE LAYER AND METHOD OF MAKING THE SAME

(71) Applicant: Amazon Technologies, Inc., Reno, NV (US)

(72) Inventors: James Robert Lim, San Jose, CA (US); Yuting Yeh, Sunnyvale, CA (US); Robert Nasry Hasbun, Fall City, WA (US); Poon-Keong Ang, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 272 days.

(21) Appl. No.: 14/253,433

(22) Filed: Apr. 15, 2014

(51) Int. Cl.
  *H01M 2/20* (2006.01)
  *H01M 2/26* (2006.01)
  *H01M 10/04* (2006.01)
  *H01M 2/02* (2006.01)

(52) U.S. Cl.
  CPC .......... *H01M 2/266* (2013.01); *H01M 2/0207* (2013.01); *H01M 10/04* (2013.01); *H01M 2220/30* (2013.01)

(58) Field of Classification Search
  CPC ..... H01M 2/266; H01M 2/0207; H01M 10/04
  USPC .......................................................... 429/161
  See application file for complete search history.

(56) References Cited

U.S. PATENT DOCUMENTS

| | | | |
|---|---|---|---|
| 5,419,982 A * | 5/1995 | Tura .................. | H01M 10/0436 429/162 |
| 6,468,693 B1 * | 10/2002 | Takami ............... | H01M 2/0275 429/176 |
| 6,558,846 B1 * | 5/2003 | Tsushima ............. | H01M 4/131 429/231.1 |
| 2002/0119367 A1 * | 8/2002 | Watanabe .............. | H01M 2/18 429/129 |

(Continued)

FOREIGN PATENT DOCUMENTS

| | | | |
|---|---|---|---|
| JP | 10027602 A | * | 1/1998 |
| JP | 2003068278 A | * | 3/2003 |
| JP | 2013062137 A | * | 4/2013 |

OTHER PUBLICATIONS

Nagayama, S., Machine translation of JP 2003-068278 A, Mar. 2003.*

(Continued)

*Primary Examiner* — Sean P Cullen
(74) *Attorney, Agent, or Firm* — Lee & Hayes, PLLC

(57) ABSTRACT

In an implementation, an electrode is produced that includes a recessed region of an electrode material layer. The electrode can be part of a battery that provides power to an electronic device. The recessed region can expose a portion of a metal layer of the electrode. A tab can be coupled to the exposed portion of the metal layer. The tab can provide an external connection for the battery to provide power to components of the electronic device. The battery can be included in a battery package that includes a packaging material. A sealing material can be used to seal the tab at a location of the battery package where the tab extends beyond a periphery of the battery package.

20 Claims, 8 Drawing Sheets

(56) References Cited

U.S. PATENT DOCUMENTS

2007/0059605 A1* 3/2007 Nakamura .............. H01M 2/16
                                                                                                        429/246
2010/0285353 A1* 11/2010 Katayama ............... H01M 2/26
                                                                                                        429/185

OTHER PUBLICATIONS

Minamigata, Atsushi, Machine Translation of JP 2013-062137 A, Apr. 4, 2013.*
Yoshihisa, Hiroyoshi, Machine Translation of JP 10-27602 A, Jan. 1998 (Year: 1998).*

* cited by examiner

US 10,147,926 B1

BATTERY PACKAGE INCLUDING ELECTRODE HAVING RECESSED REGION OF ELECTRODE MATERIAL LAYER EXPOSING A PORTION OF A CONDUCTIVE LAYER AND METHOD OF MAKING THE SAME

BACKGROUND

Batteries are often used to power electronic devices, such as mobile phones, tablet computers, laptop computers, wearable electronic devices (e.g., watches, glasses), portable media players, portable gaming devices, and so forth. As electronic devices become smaller and lighter, batteries used to power the electronic devices are also reduced in size. For example, batteries have become thinner and have smaller surface areas to accommodate the reduction in size of the electronic devices that are being powered by the batteries. However, as the size of batteries decreases, the capacity to power electronic devices often decreases, as well. Decreases in battery capacity due to the reduction in the size of batteries can limit the functionality of electronic devices and/or degrade a user's experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
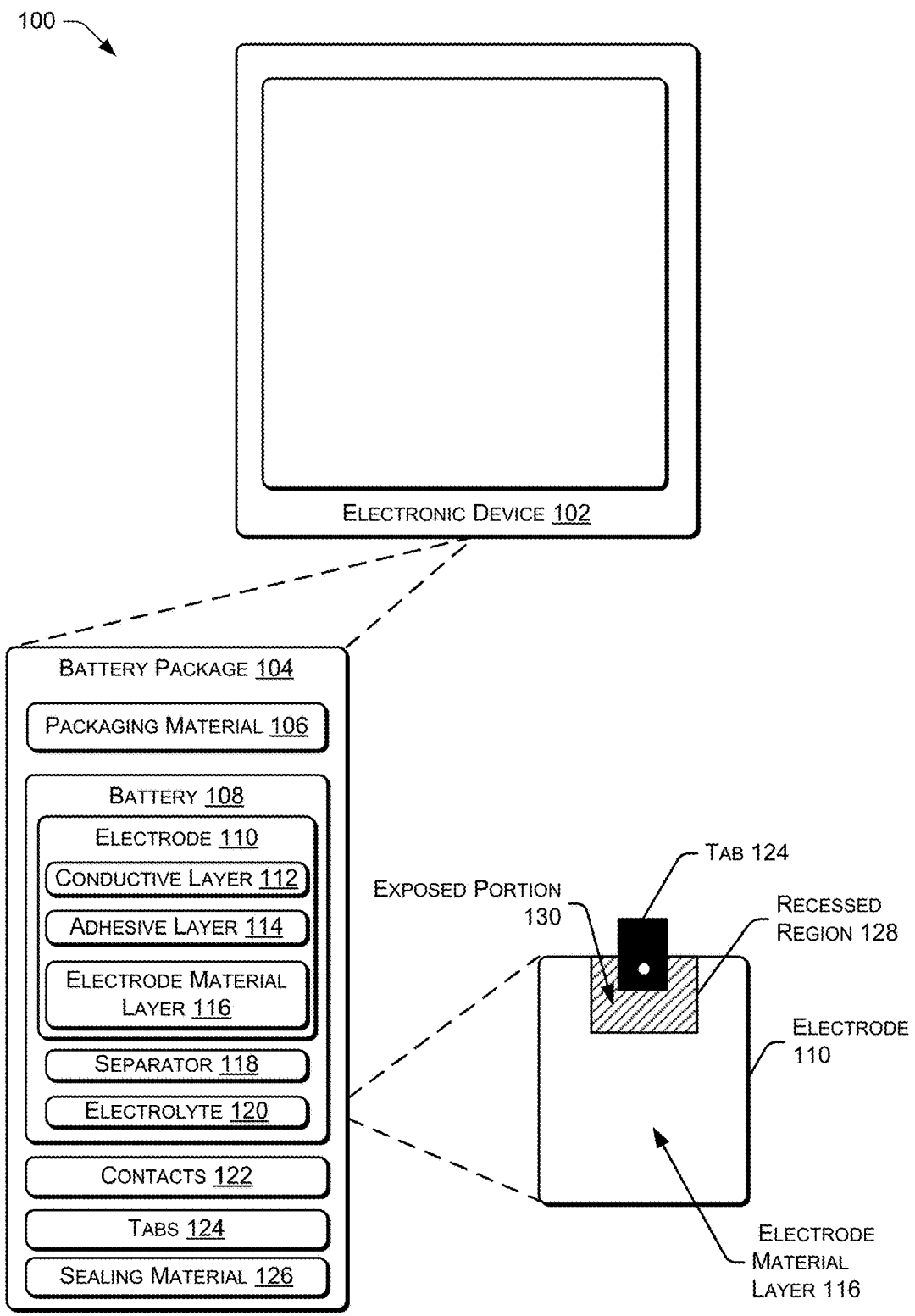
FIG. 1 illustrates an environment that includes an electronic device having a battery package that includes an electrode with a recessed region, where the recessed region includes an exposed portion of a metal layer that is used to form a contact lead.

Described herein are battery packages and methods of making battery packages, where the battery packages have a reduced size in relation to typical battery packages. In particular, a width of battery packages according to implementations described herein can be reduced with respect to a width of typical battery packages. For example, typical batteries rely on connection points comprised of portions of electrode metal layers that extend beyond the periphery of the battery package. In contrast, electrodes that are formed according to implementations herein have recessed regions of electrode material layers where the recessed regions expose portions of conductive layers that are used to provide connection points between the electrodes of a battery package and an external contact tab. The use of recessed regions to supply portions of conductive layers of electrodes for external connection shifts the points for external connection away from the periphery of the battery package resulting in a decreased width for the battery package.

In an implementation, a battery package can include a number of electrodes with each electrode having a recessed region that includes an exposed portion of a conductive layer of the respective electrode. For example, respective electrodes in the battery packages can include a layer of electrode material that is disposed on a conductive layer. The layer of electrode material can be joined to the conductive layer with an adhesive layer. The layer of electrode material can be disposed on a portion of the conductive layer with a recessed region being formed in the layer of electrode material. The recessed region can be formed such that a portion of the conductive layer is exposed. The exposed portions of the conductive layers of the electrodes included in the battery package can be coupled together.

When the conductive layers include metal, a tab can be bonded to at least a portion of an exposed portion of one of the conductive layers of electrodes having the same polarity using welding techniques. For example, a first tab can be bonded to an exposed portion of a metal layer of an anode of the battery package and a second tab can be bonded to an exposed portion of a metal layer of a cathode of the battery package using welding techniques. Additional metal layers of additional anodes and additional metal layers of cathodes can also be joined during the welding process via a weld. In this way, the first tab can be coupled to metal layers of each anode electrode in a battery package and the second tab can be coupled to metal layers of each cathode electrode in the battery package such that the first tab serves as a single contact that couples the anodes within the battery package to components of an electronic device and the second tab serves as a single contact that couples the cathodes within the battery package to components of the electronic device in order to provide power to the electronic device.

In a particular implementation, spot welding can be used to join the exposed portions of metal layers of anodes of the battery package together and to join the exposed portions of metal layers of cathodes of the battery package together. Spot welding can involve using electrodes of a spot welding machine to apply energy to particular portions of metal surfaces and melt the particular portions of the metal surfaces. Thus, the exposed portions of metal layers of electrodes included in the battery packages can be joined together by applying pressure in the region where the metal layers are to be joined to cause physical contact between the exposed portions of the metal layers and applying energy using the electrodes of the spot welding process to join the exposed portions of the metal layers via a weld.

Furthermore, a reduced or smaller battery package can be produced by applying a pattern of electrode material on a metal layer of an electrode. The pattern can include a recessed region of the electrode material that exposes a portion of the metal layer of the electrode. The pattern can also include an offset region that includes an amount of electrode material that corresponds to the amount of electrode material that is absent from the recessed region. Including an offset region in the pattern of electrode material facilitates the production of battery electrodes at line speeds that are comparable to those for typical battery electrodes. Additionally, by producing a smaller battery package according to implementations described herein, less sealing material is needed to provide protection from contamination by air, moisture, particulates and the like.

FIG. 1 illustrates an environment 100 that includes an electronic device 102. The electronic device 102 can include a number of components, such as one or more processors, memory, one or more displays, and one or more interfaces, such as communication interfaces, peripheral device interfaces, and the like. The electronic device 102 can also include one or more input/output devices, such as a keyboard, touchscreen, microphone, speakers, and so forth.

Power for the components of the electronic device 102 can be supplied from a battery package 104. The battery package 104 may be located within a housing of the electronic device 102. In some cases, the battery package 104 may be removable from the electronic device 102, while in other situations, the battery package 104 may be embedded within the electronic device 102. In an implementation, the battery package 104 can have a thickness no greater than about 2 mm, a width no greater than about 100 mm and a length no greater than about 150 mm. The battery package 104 can include packaging material 106 that forms an enclosure for one or more batteries, such as battery 108. The packaging material 106 may minimize exposure of the battery 108 to elements, such as air, water, particulates (e.g., dust), or other materials that may detrimentally affect the operation of the battery 108.

The battery 108 can include a number of electrodes, such as one or more cathodes and one or more anodes. When energy is discharged from the battery 108 to other components of the electronic device 102, an anode of the battery 108 can donate electrons and corresponding ions, such as lithium ions, via oxidation, that travel to the cathode for subsequent reduction. When the battery 108 is charged, the cathode can donate electrons and ions that travel to the anode in order to store energy in the battery 108. In the illustrative example of FIG. 1, the battery 108 includes a representative electrode 110.

The electrode 110 can include a conductive layer 112, an adhesive layer 114, and an electrode material layer 116. In an implementation, the conductive layer 112 can include one or more metals. In some situations, the conductive layer 112 can be referred to as a "current collector." The electrode material layer 116 can be disposed on the conductive layer 112 and the adhesive layer 114 can join the conductive layer 112 to the electrode material layer 116. In some instances, the electrode material layer 116 can be referred to as an "active material layer" or an "electrode active material layer" because the electrode material layer 116 actively allows electrons and ions to be transferred during charging and discharging of the battery 108.

In situations when the electrode 110 is a cathode, the conductive layer 112 can collect current that was provided to other components of the electronic device 102 as the battery 108 is discharging. In situations when the electrode 110 is an anode, the conductive layer 112 can collect current, which is stored in the anode active material (i.e. lithiated graphite) that enters the battery 108 when the battery 108 is charging. The electrode material layer 116 can include materials that couple with ions moving between the anode and cathode. In one example, when the electrode 110 is a cathode that includes electronegative material, the electrode material layer 116 can couple with ions that are donated from an anode including electropositive material. In another example, when the electrode 110 is an anode, the electrode material layer 116 couples with ions that are released from the cathode upon charging.

The battery 108 can also include a respective separator 118 disposed between each anode and cathode. The separator 118 can prevent contact between an anode and cathode of the battery 108 to avoid electrical shorting between the anode and the cathode. The separator 118 can be porous and permeable to the ions travelling between an anode and a cathode of the battery 108. Additionally, the battery 108 can include an electrolyte 120. In some cases, the separator 118 can be infiltrated or activated with the electrolyte 120. In other cases, the separator 118 can include an electrolyte matrix material, such as a polymeric matrix, that is infiltrated or activated with electrolyte. The electrolyte 120 can facilitate the movement of ions between the anode and cathode. In an illustrative implementation, the ions can include at least one ion from one or more electrode material layers 116, non-metallic counter ions or polymeric matrix backbone materials that enable transference of ions.

The battery package 104 can also include one or more contacts 122 that enable the battery 108 to provide current to other components of the electronic device 102 and to receive current from a charging device. In an implementation, the one or more contacts 122 can be coupled to the conductive layers 112 of the electrodes 110. For example, when the electrode 110 is an anode, the one or more contacts 122 can be coupled to the conductive layers 112 of the anode. In another example, when the electrode 110 is a cathode, the one or more contacts 122 can be coupled to the conductive layers 112 of the cathode. In some cases, the battery package 104 can include a single anode contact and a single cathode contact.

Furthermore, the battery 108 can include one or more tabs 124. Each of the one or more tabs 124 can correspond with a respective contact 122. To illustrate, a contact 122 of an anode can be coupled with a corresponding tab 124 and a contact 122 of a cathode can also be coupled with a corresponding tab 124. The one or more tabs 124 can extend outside of the battery package 104 to couple other components of the electronic device 102 to the battery 108.

The battery package 104 can also include one or more sealing materials 126 to protect the battery 108 from contamination and stabilize materials and components of the electrodes 110 with respect to internal movement within the battery package 104. For example, the one or more sealing materials 126 can be used in locations where the tabs 124 extend beyond the battery package 104. To illustrate, one or more sealing materials 126 can be placed at a location where the one or more tabs 124 extend beyond the battery package 104 to prevent contaminants outside of the battery package 104 from entering the battery package 104 at the location where the one or more tabs 124 extend outside of the battery package 104.

In one implementation, the battery package 104 can include a stack type electrode structure or construct. A stack type battery can include a number of layers or sheets of the electrodes 110 coupled in a vertical or horizontal stack. In another implementation, the battery package 104 can include a winding type electrode structure or construct. The winding type battery can also be referred to as a jelly roll battery or a roll-type battery. A winding type battery can include a number of layers of the electrodes 110 folded or rolled into a cylindrical, elongated rectangle, oval, or prismatic shape. A winding type battery can also include other shapes that are bent or curved to fit particular shapes of objects that contain the battery 108.

FIG. 1 illustrates an electrode 110, such as a cathode or an anode, that includes an electrode material layer 116 and a recessed region 128 of the electrode material layer 116. In an implementation, the electrode material layer 116 can be absent from the recessed region 128 to form an exposed portion 130 of the conductive layer 112. In some situations, the exposed portion 130 can be bonded to a tab 124. The tab 124 can form the external electrical conduit for one of the contacts 122 of the battery electrode 110 within the battery package 104. In an implementation, the tab 124 can be bonded to the exposed portion 130 of the conductive layer 112 through a welding operation. In an illustrative implementation, the battery package 104 can include a number of electrodes having recessed regions of electrode material layers and exposed portions of electrode conductive layers. In these scenarios, the tab 124 can be welded to the exposed portion 130 of the conductive layer 112 of one of the electrodes 110 and also join each of the conductive layers 112 to each other via the weld. In some cases, the tab 124 can be bonded to the exposed portion 130 by spot welding, while in other scenarios, the tab 124 can be bonded to the exposed portion 130 by laser welding. Spot welding can be performed with respect to exposed portions 130 of the anode conductive layers and for the exposed portions 130 of the cathode conductive layers. A spot welding operation can include applying pressure at a location to be welded in order to cause physical contact between a tab and the layers to be welded. In this way, a viable weld can be formed between each metal layer and the tab.

By forming a recessed region within an electrode material layer of an electrode, a portion of a conductive layer of the electrode is exposed. In this way, the width of a battery package can be minimized because a portion of the conductive layer does not extend beyond the space occupied by the electrode material layer to allow coupling between the conductive layer and an external contact. Instead, the exposed portion of the conductive layer is located within the space occupied by the electrode material layer. Additionally, by coupling the exposed portions of the conductive layers via spot welding to tabs within the electrode material, typical sealing materials are used to reduce battery package width. Accordingly, the amount of the sealing materials used in the battery package is minimized with respect to battery package arrangements that are not produced according the implementations described herein.

Figure 2:
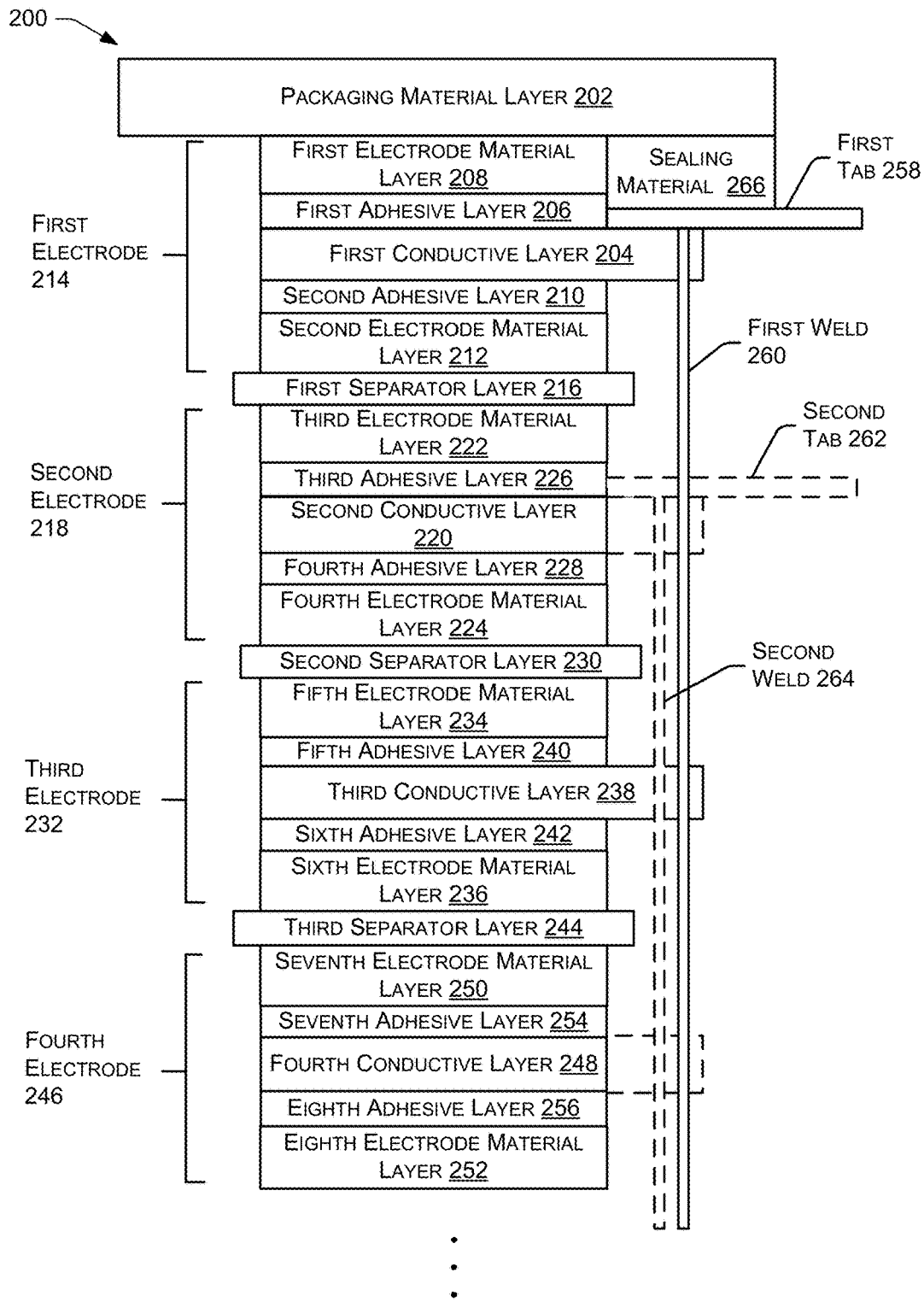
FIG. 2 illustrates a cross-sectional view of an example battery package that includes a plurality of electrodes with each electrode having a recessed region that includes an exposed portion of a conductive layer and the exposed portions of the conductive layers are joined via a weld.

FIG. 2 illustrates a cross-sectional view of an example battery package 200 that includes a plurality of electrodes with each electrode having a recessed region that includes an exposed portion of a conductive layer and the exposed portions of the conductive layers are joined via a weld. In an implementation, the battery package 200 includes a packaging material layer 202. The packaging material layer 202 can form an outer periphery for the battery package 200. For example, in some cases, the packaging material layer 202 can enclose at least a portion of the components of the battery package 200. The packaging material layer 202 can protect components of the battery package 200 from contamination by water, dust, oxygen, and other materials. The packaging material layer 202 can have a thickness of at least about 70 micrometers, at least about 85 micrometers, or at least about 100 micrometers. In some implementations, the packaging material layer 202 can have a thickness no greater than about 200 micrometers, no greater than about 175 micrometers, no greater than about 150 micrometers, or no greater than about 125 micrometers. In an illustrative implementation, the packaging material layer 202 can have a thickness included in a range of about 60 micrometers to about 220 micrometers. In another illustrative implementation, the packaging material layer 202 can have a thickness included in a range of about 80 micrometers to about 120 micrometers. The packaging material layer 202 can include one or more laminate materials. For example, the packaging material layer 202 can include one or more laminated layers including at least one of aluminum, nylon, polyethylene terephthalate or polypropylene.

The battery package 200 can also include a first conductive layer 204, a first adhesive layer 206 and a first electrode material layer 208. Additionally, the battery package 200 can include a second adhesive layer 210 and a second electrode material layer 212. In the illustrative implementation of FIG. 2, the first conductive layer 204, the first adhesive layer 206, the first electrode material layer 208, the second adhesive layer 210 and the second electrode material layer 212 comprise a first electrode 214. In an implementation, the first electrode 214 can include a cathode. In other implementations, the first electrode 214 can include an anode.

In an implementation, the first conductive layer 204 can have a thickness of at least about 10 micrometers, at least about 15 micrometers, or at least about 20 micrometers. Additionally, the first conductive layer 204 can have a thickness no greater than about 50 micrometers, no greater than about 40 micrometers, or no greater than about 30 micrometers. In an illustrative implementation, the first conductive layer 204 can have a thickness included in a range of about 8 micrometers to about 60 micrometers. In another illustrative implementation, the first conductive layer 204 can have a thickness included in a range of about 12 micrometers to about 25 micrometers. When the first electrode 214 is a cathode, the first conductive layer 204 can include at least one of aluminum, nickel, alloys of aluminum or alloys of nickel. When the first electrode 214 is an anode, the first conductive layer 204 can include at least one of copper or alloys of copper.

The first adhesive layer 206 can join a first side of the first conductive layer 204 to the first electrode material layer 208 and the second adhesive layer 210 can join a second side of the first conductive layer 204 to the second electrode material layer 212. At least one of the first adhesive layer 206 or the second adhesive layer 210 can have a thickness of at least about 0.1 micrometers, at least about 0.5 micrometers, at least about 1 micrometer or at least about 5 micrometers. In an implementation, at least one of the first adhesive layer 206 or the second adhesive layer 210 can have a thickness no greater than about 20 micrometers, no greater than about 15 micrometers, or no greater than about 10 micrometers. In an illustrative implementation, at least one of the first adhesive layer 206 or the second adhesive layer 210 can have thickness included in a range of about 0.08 micrometers to about 25 micrometers. In another illustrative implementation, at least one of the first adhesive layer 206 or the second adhesive layer 210 can have a thickness included in a range of about 0.2 micrometers to about 8 micrometers.

At least one of the first adhesive layer 206 or the second adhesive layer 210 can include one or more components. For example, at least one of the first adhesive layer 206 or the second adhesive layer 210 can include at least one of a conductive component or a binder. In some cases, the first adhesive layer 206 can be applied to the first conductive layer 204 and/or the second adhesive layer 210 can be applied to the first conductive layer 204 as a solution that includes a solvent and at least one of the conductive component or the binder. In an implementation, the conductive component of at least one of the first adhesive layer 206 or the second adhesive layer 210 can include carbon. In a particular implementation, the conductive component can include at least one of carbon black, graphite, carbon nanotubes or graphene. In some cases, the conductive component of at least one of the first adhesive layer 206 or the second adhesive layer 210 can include one or more polymeric materials. In various implementations, the conductive composite component can include a polymeric nanostructure having a conductive filler, such as a carbon filler. A binder for at least one of the first adhesive layer 206 or the second adhesive layer 210 can include one or more polyimide-based materials. In an illustrative implementation, the binder can include at least one of poly(acrylic acid), polyethylene oxide, poly(vinyl alcohol), poly(vinylidene fluoride), carboxymethyl cellulose, polyvinyl pyrrolidone or polytetrafluoroethylene. Further, the solvent used to apply the at least one of the conductive component and/or the binder to the first conductive layer 204 can include at least one of N-Methyl-2-Pyrrolidone (NMP), another suitable organic solvent or a water-based solution. The solvent or a mixture of solvents utilized to apply the at least one of the conductive component or the binder to the first conductive layer 204 can depend on at least one of dispersion of the binder in the solvent or mixture of solvents or the ability of the binder to dissolve in the solvent or mixture of solvents.

In an implementation, at least one of the first electrode active material layer 208 or the second electrode active material layer 212 can have a thickness of at least about 10 micrometers, at least about 50 micrometers, at least about 100 micrometers, or at least about 200 micrometers. In other implementations, at least one of the first electrode material layer 208 or the second electrode active material layer 212 can have a thickness no greater than about 500 micrometers, no greater than about 400 micrometers, no greater than about 300 micrometers, or no greater than about 250 micrometers. In an illustrative implementation, at least one of the first electrode material layer 208 or the second electrode material layer 212 can have a thickness included in a range of about 10 micrometers to about 500 micrometers. In another illustrative implementation, at least one of the first electrode material layer 208 or the second electrode material layer 212 can have a thickness included in a range of about 25 micrometers to about 100 micrometers.

The first electrode active material layer 208 can be applied to the first adhesive layer 206 using a coating process and/or the second electrode active material layer 212 can be applied to the second adhesive layer 210 using a coating process. In some cases, the first electrode material layer 208 can be applied to the first adhesive layer 206 and/or the second electrode active material layer 212 can be applied to the second adhesive layer 210 using a slot die coating process. In other situations, the first electrode material layer 208 can be applied to the first adhesive layer 206 and/or the second electrode material layer 212 can be applied to the second adhesive layer 210 using a gravure coating process. In an implementation, at least one of the first electrode material layer 208 or the second electrode material layer 212 can include one or more components, such as at least one of a binder, a conductive filler or an active material. The active material can store and transfer electrons and ions. In an implementation, at least one of the active material of the first electrode material layer 208 or the active material of the second electrode material layer 212 can include at least one of $LiCoO_2$, $Li_xV_2O_5$, $LiFePO_4$, $Li(Ni_xCo_yMn_z)O_2$, $Li(Ni_xCo_yAl_z)O_2$ or $xLi_2MnO_3.(1-x)LiMO_2$ or other layered structures or off-stoichiometric variants. In various implementations, at least one of the active material of the first electrode material layer 208 or the active material of the second electrode material layer 212 can also include another suitable electronegative Li ion host material. At least one of a binder of the first electrode material layer 208 or a binder of the second electrode material layer 212 can include at least one of poly acrylic acid, polyethylene oxide, poly vinyl alcohol, poly vinylidene fluoride, carboxymethyl cellulose, polyvinyl pyrrolidone, polytetrafluoroethylene, styrene-butadiene, other co-polymers, other co-block polymers and/or combinations thereof and other binder agents that have high active-material adhesion energy. Further, the solvent used to apply the at least one of the conductive component, the binder or the active material to the first adhesive layer 206 and/or the second adhesive layer 210 can include at least one of N-Methyl-2-Pyrrolidone (NMP), another suitable organic solvent or a water-based solution.

The battery package 200 can also include a first separator layer 216 that enables ions to flow between the first electrode 214 and a second electrode 218. The first separator layer 216 can have a thickness of at least about 10 micrometers, at least about 15 micrometers, or at least about 20 micrometers. Additionally, the first separator layer 216 can have a thickness no greater than about 75 micrometers, no greater than about 50 micrometers, or no greater than about 25 micrometers. In an illustrative implementation, the first separator layer 216 can have a thickness included in a range of about 8 micrometers to about 100 micrometers. In another illustrative implementation, the first separator layer 216 can have a thickness included in a range of about 12 micrometers to about 35 micrometers. In various implementations, the first separator layer 216 can include a porous and a substantially chemically and electrically inert material. In some cases, the first separator layer 216 can include at least one of polyethylene or polypropylene.

In some situations, at least one of the first separator layer 216, the first electrode material layer 208 or the second electrode material layer 212 can include one or more electrolytes. The one or more electrolytes can be included in a liquid material in some scenarios, while being included in a solid material in other scenarios. In still other cases, the one or more electrolytes can be included in a gel.

The second electrode 218 can include a second conductive layer 220 having a third electrode material layer 222 disposed on a first side of the second conductive layer 220 and a fourth electrode material layer 224 disposed on a second side of the second conductive layer 220. The third electrode material layer 222 can be joined to the second conductive layer 220 using a third adhesive layer 226 and the fourth electrode material layer 224 can be joined to the second conductive layer 220 using a fourth adhesive layer 228. In some cases, the second electrode 218 can have a different polarity than a polarity of the first electrode 214. In one example, the second electrode 218 can include an anode when the first electrode 214 includes a cathode. In another example, the second electrode 218 can include a cathode when the first electrode 214 includes an anode.

In an implementation, at least one of the third electrode material layer 222 or the fourth electrode material layer 224 can have a thickness of at least about 10 micrometers, at least about 50 micrometers, at least about 100 micrometers, or at least about 200 micrometers. In other implementations, at least one of the third electrode material layer 222 or the fourth electrode material layer 224 can have a thickness no greater than about 500 micrometers, no greater than about 400 micrometers, no greater than about 300 micrometers, or no greater than about 250 micrometers. In an illustrative implementation, at least one of the third electrode material layer 222 or the fourth electrode material layer 224 can have a thickness included in a range of about 10 micrometers to about 500 micrometers. In another illustrative implementation, at least one of the third electrode material layer 222 or the fourth electrode material layer 224 can have a thickness included in a range of about 25 micrometers to about 100 micrometers.

In an implementation, at least one of the third electrode material layer 222 or the fourth electrode material layer 224 can include one or more components, such as at least one of a binder, a conductive filler or an active material. The active material can store and transfer electrons and ions. In some implementations, the active material of at least one of the third electrode material layer 222 or the fourth electrode material layer 224 can include at least one of carbon (such as graphite, amorphous carbon or a hybrid of graphite and amorphous carbon), $Li_4Ti_5O_{12}$, silicon, germanium, tin, antimony, aluminum, or magnesium. In various implementations, the active material of at least one of the third electrode material layer 222 or the fourth electrode material layer 224 can also include another suitable electropositive Li ion host material. The active material of at least one of the third electrode material layer 222 or the fourth electrode material layer 224 can have one or more structures, such as nanowires, nanotubes, nanoscrolls, nanosheets, nano-core-shell structures, hollow nanowires hollow nanospheres, nanospheres, or nanoparticles. A binder of at least one of the third electrode material layer 222 or the fourth electrode material layer 224 can include at least one of poly acrylic acid, polyethylene oxide, poly vinyl alcohol, poly vinylidene fluoride, carboxymethyl cellulose, polyvinyl pyrrolidone, polytetrafluoroethylene, styrene-butadiene, other co-polymers, other co-block polymers and/or combinations thereof and other binder agents that have high active-material adhesion energy.

The third adhesive layer 226 can join the second conductive layer 220 to the third electrode material layer 222 and the fourth adhesive layer 228 can join the second conductive layer 220 to the fourth electrode material layer 224. At least one of the third electrode material layer 222 can be applied to the third adhesive layer 226 and the fourth electrode material layer 224 can be applied to the fourth adhesive layer 228 using a coating process. In some cases, at least one of the third electrode material layers 222 can be applied to the third adhesive layer 226 or the fourth electrode material layer 224 can be applied to the fourth adhesive layer 228 using a slot die coating process. In other situations, at least one of the third electrode material layer 222 can be applied to the third adhesive layer 226 or the fourth electrode material layer 224 can be applied to the fourth adhesive layer 228 using a gravure coating process. Further, a solvent used to apply the at least one of the conductive component of the third electrode material layer 222, the active material of the third electrode material layer 222, or the binder of the third electrode material layer 222 to the third adhesive layer 226 can include at least one of N-Methyl-2-Pyrrolidone (NMP), another suitable organic solvent or a water-based solution. Additionally, a solvent used to apply the at least one of the conductive component of the fourth electrode material layer 224, the active material of the fourth electrode material layer 224, or the binder of the fourth electrode material layer 224 to the fourth adhesive layer 228 can also include at least one of N-Methyl-2-Pyrrolidone (NMP), another suitable organic solvent or a water-based solution.

At least one of the third adhesive layer 226 or the fourth adhesive layer 228 can have a thickness of at least about 0.1 micrometers, at least about 0.5 micrometers, at least about 1 micrometer or at least about 5 micrometers. In an implementation, at least one of the third adhesive layer 226 or the fourth adhesive layer 228 can have a thickness no greater than about 20 micrometers, no greater than about 15 micrometers, or no greater than about 10 micrometers. In an illustrative implementation, at least one of the third adhesive layer 226 or the fourth adhesive layer 228 can have thickness included in a range of about 0.08 micrometers to about 25 micrometers. In another illustrative implementation, at least one of the third adhesive layer 226 or the fourth adhesive layer 228 can have a thickness included in a range of about 0.2 micrometers to about 8 micrometers.

In an implementation, the second conductive layer 220 can have a thickness of at least about 10 micrometers, at least about 15 micrometers, or at least about 20 micrometers. Additionally, the second conductive layer 220 can have a thickness no greater than about 50 micrometers, no greater than about 40 micrometers, or no greater than about 30 micrometers. In an illustrative implementation, the second conductive layer 220 can have a thickness included in a range of about 8 micrometers to about 60 micrometers. In another illustrative implementation, the second conductive layer 220 can have a thickness included in a range of about 12 micrometers to about 25 micrometers. The second conductive layer 220 can include at least one of aluminum, nickel, copper, alloys of aluminum, alloys of nickel, or alloys of copper.

Additionally, the battery package 200 can also include a second separator layer 230 that enables ions to flow between the second electrode 218 and a third electrode 232. The second separator layer 230 can have a thickness of at least about 10 micrometers, at least about 15 micrometers, or at least about 20 micrometers. Additionally, the second separator layer 230 can have a thickness no greater than about 75 micrometers, no greater than about 50 micrometers, or no greater than about 25 micrometers. In an illustrative implementation, the second separator layer 230 can have a thickness included in a range of about 8 micrometers to about 100 micrometers. In another illustrative implementation, the second separator layer 230 can have a thickness included in a range of about 12 micrometers to about 35 micrometers. In various implementations, the second separator layer 230 can include a porous and a substantially chemically and electrically inert material. In some cases, the second separator layer 230 can include at least one of polyethylene or polypropylene.

In some situations, at least one of the second separator layer 230, the third electrode material layer 222 or the fourth electrode material layer 224 can include one or more electrolytes. The one or more electrolytes can be included in a liquid material in some scenarios, while being included in a solid material in other scenarios. In still other cases, the one or more electrolytes can be included in a gel.

The third electrode 232 can include a fifth electrode material layer 234 and a sixth electrode material layer 236 disposed on a third conductive layer 238. The fifth electrode material layer 234 can be joined to a first side of the third conductive layer 238 with a fifth adhesive layer 240 and the sixth electrode material layer 236 can be joined to a second side of the third conductive layer 238 with a sixth adhesive layer 242. In some scenarios, the third electrode 232 can have a same polarity as the first electrode 214 and a different polarity from the second electrode 218. In one example, the first electrode 214 and the third electrode 232 can be cathodes and the second electrode 218 can be an anode. In another example, the first electrode 214 and the third electrode 232 can be anodes and the second electrode 218 can be a cathode.

In an implementation, at least one of the fifth electrode active material layer 234 or the sixth electrode active material layer 236 can have a thickness of at least about 10 micrometers, at least about 50 micrometers, at least about 100 micrometers, or at least about 200 micrometers. In other implementations, at least one of the fifth electrode material layer 234 or the sixth electrode material layer 236 can have a thickness no greater than about 500 micrometers, no greater than about 400 micrometers, no greater than about 300 micrometers, or no greater than about 250 micrometers. In an illustrative implementation, at least one of the fifth electrode material layer 234 or the sixth electrode material layer 236 can have a thickness included in a range of about 10 micrometers to about 500 micrometers. In another illustrative implementation, at least one of the fifth electrode material layer 234 or the sixth electrode material layer 236 can have a thickness included in a range of about 25 micrometers to about 100 micrometers.

The fifth electrode material layer 234 can be applied to the fifth adhesive layer 240 and/or the sixth electrode material layer 236 can be applied to the sixth adhesive layer 242 using a coating process. In some cases, the fifth electrode material layer 234 can be applied to the fifth adhesive layer 240 and/or the sixth electrode material layer 236 can be applied to the sixth adhesive layer 242 using a slot die coating process. In other situations, the fifth electrode material layer 234 can be applied to the fifth adhesive layer 240 and/or the sixth electrode material layer 236 can be applied to the sixth adhesive layer 242 using a gravure coating process. In an implementation, at least one of the fifth electrode material layer 234 or the sixth electrode material layer 236 can include one or more components, such as at least one of a binder, a conductive filler or an active material. The active material can store and transfer electrons and ions. In an implementation, at least one of the active material of the fifth electrode material layer 234 or the active material of the sixth electrode material layer 236 can include at least one of $LiCoO_2$, $Li_xV_2O_5$, $LiFePO_4$, $Li(Ni_xCo_yMn_z)O_2$, $Li(Ni_xCo_yAl_z)O_2$ or $xLi_2MnO_3\cdot(1-x)LiMO_2$ or other layered structures or off-stoichiometric variants. In various implementations, at least one of the active material of the fifth electrode material layer 234 or the active material of the sixth electrode material layer 236 can also include another suitable electronegative Li ion host material. At least one of a binder of the fifth electrode material layer 234 or the sixth electrode material layer 236 can include at least one of poly acrylic acid, polyethylene oxide, poly vinyl alcohol, poly vinylidene fluoride, carboxymethyl cellulose, polyvinyl pyrrolidone, polytetrafluoroethylene, styrene-butadiene, other co-polymers, other co-block polymers and/or combinations thereof and other binder agents that have high active-material adhesion energy. Further, the solvent used to apply the at least one of the conductive component, the binder or the active material of the fifth electrode material layer 234 to the fifth adhesive layer 240 and/or the solvent used to apply the at least one of the conductive component, the binder or the active material of the sixth electrode material layer 236 to the sixth adhesive layer 242 can include at least one of N-Methyl-2-Pyrrolidone (NMP), another suitable organic solvent or a water-based solution.

In an implementation, the third conductive layer 238 can have a thickness of at least about 10 micrometers, at least about 15 micrometers, or at least about 20 micrometers. Additionally, the third conductive layer 238 can have a thickness no greater than about 50 micrometers, no greater than about 40 micrometers, or no greater than about 30 micrometers. In an illustrative implementation, the third conductive layer 238 can have a thickness included in a range of about 8 micrometers to about 60 micrometers. In another illustrative implementation, the third conductive layer 238 can have a thickness included in a range of about 12 micrometers to about 25 micrometers. When the third electrode 232 is a cathode, the third conductive layer 238 can include at least one of aluminum, nickel, alloys of aluminum, or alloys of nickel. When the third electrode 232 is an anode, the third conductive layer 238 can include at least one of copper or alloys of copper.

At least one of the fifth adhesive layer 240 or the sixth adhesive layer 242 can have a thickness of at least about 0.1 micrometers, at least about 0.5 micrometers, at least about 1 micrometer or at least about 5 micrometers. In an implementation, at least one of the fifth adhesive layer 240 or the sixth adhesive layer 242 can have a thickness no greater than about 20 micrometers, no greater than about 15 micrometers, or no greater than about 10 micrometers. In an illustrative implementation, at least one of the fifth adhesive layer 240 or the sixth adhesive layer 242 can have thickness included in a range of about 0.08 micrometers to about 25 micrometers. In another illustrative implementation, at least one of the fifth adhesive layer 240 or the sixth adhesive layer 242 can have a thickness included in a range of about 0.2 micrometers to about 8 micrometers.

At least one of the fifth adhesive layer 240 or the sixth adhesive layer 242 can include one or more components. For example, at least one of the fifth adhesive layer 240 or the sixth adhesive layer 242 can include at least one of a conductive component or a binder. In some cases, the fifth adhesive layer 240 can be applied to the third conductive layer 238 and/or the sixth adhesive layer 242 can be applied to the third conductive layer 238 as a solution that includes a solvent and at least one of the conductive component or the binder. In an implementation, the conductive component of at least one of the fifth adhesive layer 240 or the sixth adhesive layer 242 can include carbon. In a particular implementation, the conductive component can include at least one of carbon black, graphite, carbon nanotubes or graphene. In some cases, the conductive component of the fifth adhesive layer 240 and/or the conductive component of the sixth adhesive layer 242 can include one or more polymeric materials. In various implementations, the conductive composite component can include a polymeric nanostructure having a conductive filler, such as a carbon filler. At least one of a binder for the fifth adhesive layer 240 or a binder of the sixth adhesive layer 242 can include one or more polyimide-based materials. In an illustrative implementation, the binder can include at least one of poly acrylic acid, polyethylene oxide, poly vinyl alcohol, poly vinylidene fluoride, carboxymethyl cellulose, polyvinyl pyrrolidone or polytetrafluoroethylene. Further, the solvent used to apply the at least one of the conductive component and/or the binder of at least one of the fifth adhesive layer 240 or the sixth adhesive layer 242 to the third conductive layer 238 can include at least one of N-Methyl-2-Pyrrolidone (NMP), another suitable organic solvent or a water-based solution. The solvent or a mixture of solvents utilized to apply the at least one of the conductive component or the binder of at least one of the fifth adhesive layer 240 or the sixth adhesive layer 242 to the third conductive layer 238 can depend on at least one of dispersion of the binder in the solvent or mixture of solvents or the ability of the binder to dissolve in the solvent or mixture of solvents.

Further, the battery package 200 can also include a third separator layer 244 that enables ions to flow between the third electrode 232 and a fourth electrode 246. The third separator layer 244 can have a thickness of at least about 10 micrometers, at least about 15 micrometers, or at least about 20 micrometers. Additionally, the third separator layer 244 can have a thickness no greater than about 75 micrometers, no greater than about 50 micrometers, or no greater than about 25 micrometers. In an illustrative implementation, the third separator layer 244 can have a thickness included in a range of about 8 micrometers to about 100 micrometers. In another illustrative implementation, the third separator layer 244 can have a thickness included in a range of about 12 micrometers to about 35 micrometers. In various implementations, the third separator layer 244 can include a porous and a substantially chemically and electrically inert material. In some cases, the third separator layer 244 can include at least one of polyethylene or polypropylene.

The fourth electrode 246 can include a fourth conductive layer 248 having a seventh electrode material layer 250 disposed on a first side of the fourth conductive layer 248 and a eighth electrode material layer 252 disposed on a second side of the fourth conductive layer 248. The seventh electrode material layer 250 can be joined to the fourth conductive layer 248 using a seventh adhesive layer 254 and the eighth electrode material layer 252 can be joined to the fourth conductive layer 248 using an eighth adhesive layer 256. In some cases, the fourth electrode 246 can have a different polarity than a polarity of the first electrode 214 and/or the third electrode 232 and the same polarity as the second electrode 218. In one example, the fourth electrode 246 can include an anode when the first electrode 214 and the third electrode 232 include a cathode. In another example, the fourth electrode 246 can include a cathode when the first electrode 214 and the third electrode 232 include an anode.

In an implementation, at least one of the seventh electrode material layer 250 or the eighth electrode material layer 252 can have a thickness of at least about 10 micrometers, at least about 50 micrometers, at least about 100 micrometers, or at least about 200 micrometers. In other implementations, at least one of the seventh electrode material layer 250 or the eighth electrode material layer 252 can have a thickness no greater than about 500 micrometers, no greater than about 400 micrometers, no greater than about 300 micrometers, or no greater than about 250 micrometers. In an illustrative implementation, at least one of the seventh electrode material layer 250 or the eighth electrode material layer 252 can have a thickness included in a range of about 10 micrometers to about 500 micrometers. In another illustrative implementation, at least one of the seventh electrode material layer 250 or the eighth electrode material layer 252 can have a thickness included in a range of about 25 micrometers to about 100 micrometers.

In an implementation, at least one of the seventh electrode material layer 250 or the eighth electrode material layer 252 can include one or more components, such as at least one of a binder, a conductive filler or an active material. The active material can store and transfer electrons and ions. In some implementations, the active material of at least one of the seventh electrode material layer 250 or the eighth electrode material layer 252 can include at least one of carbon (such as graphite, amorphous carbon or a hybrid of graphite and amorphous carbon), $Li_4Ti_5O_{12}$, silicon, germanium, tin, antimony, aluminum, or magnesium. In various implementations, the active material of at least one of the seventh electrode material layer 250 or the eighth electrode material layer 252 can also include another suitable electropositive Li ion host material. The active material of at least one of the seventh electrode material layer 250 or the eighth electrode material layer 252 can have one or more structures, such as nanowires, nanotubes, nanoscrolls, nanosheets, nano-core-shell structures, hollow nanowires hollow nanospheres, nanospheres, or nanoparticles. A binder of at least one of the seventh electrode material layer 250 or the eighth electrode material layer 252 can include at least one of poly acrylic acid, polyethylene oxide, poly vinyl alcohol, poly vinylidene fluoride, carboxymethyl cellulose, polyvinyl pyrrolidone, polytetrafluoroethylene, styrene-butadiene, other co-polymers, other co-block polymers and/or combinations thereof and other binder agents that have high active-material adhesion energy.

In some situations, at least one of the third separator layer 244, the fifth electrode material layer 234, the sixth electrode material layer 236, the seventh electrode material layer 250 or the eighth electrode material layer 252 can include one or more electrolytes. The one or more electrolytes can be included in a liquid material in some scenarios, while being included in a solid material in other scenarios. In still other cases, the one or more electrolytes can be included in a gel.

The seventh adhesive layer 254 can join a first side of the fourth conductive layer 248 to the seventh electrode material layer 250 and the eighth adhesive layer 256 can join a second side of the fourth conductive layer 248 to the eighth electrode material layer 252. At least one of the seventh electrode material layer 250 can be applied to the seventh adhesive layer 254 and the eighth electrode material layer 252 can be applied to the eighth adhesive layer 256 using a coating process. In some cases, at least one of the seventh electrode material layer 250 can be applied to the seventh adhesive layer 254 or the eighth electrode material layer 252 can be applied to the eighth adhesive layer 256 using a slot die coating process. In other situations, at least one of the seventh electrode material layer 250 can be applied to the seventh adhesive layer 254 or the eighth electrode material layer 252 can be applied to the eighth adhesive layer 256 using a gravure coating process. Further, a solvent used to apply the at least one of the conductive component of the seventh electrode material layer 250, the active material of the seventh electrode material layer 250, or the binder of the seventh electrode material layer 250 to the seventh adhesive layer 254 can include at least one of N-Methyl-2-Pyrrolidone (NMP), another suitable organic solvent or a water-based solution. Additionally, a solvent used to apply the at least one of the conductive component of the eighth electrode material layer 252, the active material of the eighth electrode material layer 252 or the binder of the eighth electrode material layer 252 to the eighth adhesive layer 256 can also include at least one of N-Methyl-2-Pyrrolidone (NMP), another suitable organic solvent or a water-based solution.

At least one of the seventh adhesive layer 254 or the eighth adhesive layer 256 can have a thickness of at least about 0.1 micrometers, at least about 0.5 micrometers, at least about 1 micrometer or at least about 5 micrometers. In an implementation, at least one of the seventh adhesive layer 254 or the eighth adhesive layer 256 can have a thickness no greater than about 20 micrometers, no greater than about 15 micrometers, or no greater than about 10 micrometers. In an illustrative implementation, at least one of the seventh adhesive layer 254 or the eighth adhesive layer 256 can have thickness included in a range of about 0.08 micrometers to about 25 micrometers. In another illustrative implementation, at least one of the seventh adhesive layer 254 or the eighth adhesive layer 256 can have a thickness included in a range of about 0.2 micrometers to about 8 micrometers.

In an implementation, the fourth conductive layer 248 can have a thickness of at least about 10 micrometers, at least about 15 micrometers, or at least about 20 micrometers. Additionally, the fourth conductive layer 248 can have a thickness no greater than about 50 micrometers, no greater than about 40 micrometers, or no greater than about 30 micrometers. In an illustrative implementation, the fourth conductive layer 248 can have a thickness included in a range of about 8 micrometers to about 60 micrometers. In another illustrative implementation, the fourth conductive layer 248 can have a thickness included in a range of about 12 micrometers to about 25 micrometers. The fourth conductive layer 248 can include at least one of aluminum, nickel, copper, alloys of aluminum, alloys of nickel, or alloys of copper.

A first tab 258 can be bonded to the first conductive layer 204. The first tab 258 can include one or more metals. In some cases, the type of metal of the first tab 258 can depend on a type of welding used for the bonding. For example, the first tab 258 can include at least one of nickel, alloys of nickel, aluminum, alloys of aluminum, copper or alloys of copper when spot welding is used to bond the first tab 258 to the first conductive layer 204. Additionally, when other welding techniques are used to bond the first tab 258 to the first conductive layer 204, other metals can be used.

The first tab 258 can have a shape, such as a rectangle, a square, an ellipse, and the like. Further, the first tab 258 can have a width of at least about 0.3 mm, at least about 1 mm, at least about 3 mm, or at least about 5 mm. The first tab 258 can also have a width no greater than about 10 mm, no greater than about 8 mm, or no greater than about 6 mm. In an illustrative example, the first tab 258 can have a width included in a range of about 0.5 mm to about 12 mm. In another illustrative example, the first tab 258 can have a width included in a range of about 1 mm to about 6 mm. In some implementations, the first tab 258 can have a length included in a range of about 2 mm to about 20 mm. In other implementations, the first tab 258 can have a length included in a range of about 4 mm to about 12 mm.

When the first tab 258 is welded to the first conductive layer 204, a first weld 260 can be produced between the first conductive layer 204 and the third conductive layer 238. In some cases, the portions of the first conductive layer 204 and the third conductive layer 238 that are joined by the first weld 260 can correspond to an exposed metal portion included in respective recessed regions of the first electrode material layer 208, the second electrode material layer 212, the fifth electrode material layer 234 and the sixth electrode material layer 236, such as the example recessed region 128 of FIG. 1. In addition, at least a portion of the first weld 260 can be disposed within an opening of the second conductive layer 220 and an opening of the fourth conductive layer 248. The openings can be formed by removing a portion of the second conductive layer 220 and a portion of the fourth conductive layer 248, such as via a punch process, where the portion removed has a location corresponding to a location of the exposed metal portions of the first conductive layer 204 and the third conductive layer 238. The first weld 260 can include materials from at least one of the first conductive layer 204 or the third conductive layer 238.

The battery package 200 can also include a second tab 262 bonded to the second conductive layer 220. The second tab 262 can include one or more metals. In some cases, the type of metal of the second tab 262 can depend on a type of welding used for the bonding. For example, the second tab 262 can include at least one of nickel, alloys of nickel, aluminum, alloys of aluminum, copper or alloys of copper when spot welding is used to bond the second tab 262 to the second conductive layer 220. Additionally, when other welding techniques are used to bond the second tab 262 to the second conductive layer 220, other metals can be used.

When the second tab 262 is welded to the second conductive layer 220, a second weld 264 can be produced between the second conductive layer 220 and the fourth conductive layer 248. In some cases, the portions of the second conductive layer 220 and the fourth conductive layer 248 that are joined by the second weld 264 can correspond to an exposed metal portion included in respective recessed regions of the third electrode material layer 222, the fourth electrode material layer 224, the seventh electrode material layer 250 and the eighth electrode material layer 252, such as the example recessed region 128 of FIG. 1. In addition, at least a portion of the second weld 264 can be disposed within an opening of the third conductive layer 238. The opening can be formed by removing a portion of the third conductive layer 238, such as via a punch process, where the portion removed has a location corresponding to a location of the exposed metal portions of the second conductive layer 220 and the fourth conductive layer 248. The second weld 264 can include materials from at least one of the second conductive layer 220 or the fourth conductive layer 248.

A first portion of the first tab 258 and a first portion of the second tab 262 can be located within a periphery of the battery package 200 formed by the packaging material layer 202. A second portion of the first tab 258 and a second portion of the second tab 262 can be located outside of the periphery of the battery package 200 formed by the packaging material layer 202. Additionally, the first weld 260, the second weld 264, the exposed portions of the first conductive layer 204 and the third conductive layer 238 joined by the first weld 260 and the exposed portions of the second conductive layer 220 and the fourth conductive layer 248 joined by the second weld 264 can be located within the periphery of the battery package 200 formed by the packaging material layer 202.

The battery package 200 also includes a sealing material 266 that can be disposed around the first tab 258 and between the first tab 258 and the packaging material layer 202 to minimize contamination of the battery package 200. Although not shown in FIG. 2, the sealing material 266 can also be disposed around the second tab 262 to minimize contamination of the battery package 200.

Although the illustrative implementation of FIG. 2 shows the battery package 200 including the first electrode 214, the second electrode 218, the third electrode 232 and the fourth electrode 246, the battery package 200 can include one or more additional electrodes, sandwiched between the packaging material layer 202 for a completely hermetic seal of the battery package 200. In some cases, the battery package 200 can include one or more additional electrodes having a same polarity as the second electrode 218 and the fourth electrode 246. Exposed portions of the conductive layers of these additional electrodes can be joined with exposed portions of the second conductive layer 220 and the fourth conductive layer 248 by the second weld 264. Further, the battery package 200 can include one or more additional electrodes having a same polarity as the first electrode 214 and the third electrode 232 having exposed conductive layer portions that are also joined together by the first weld 258.

Figure 3:
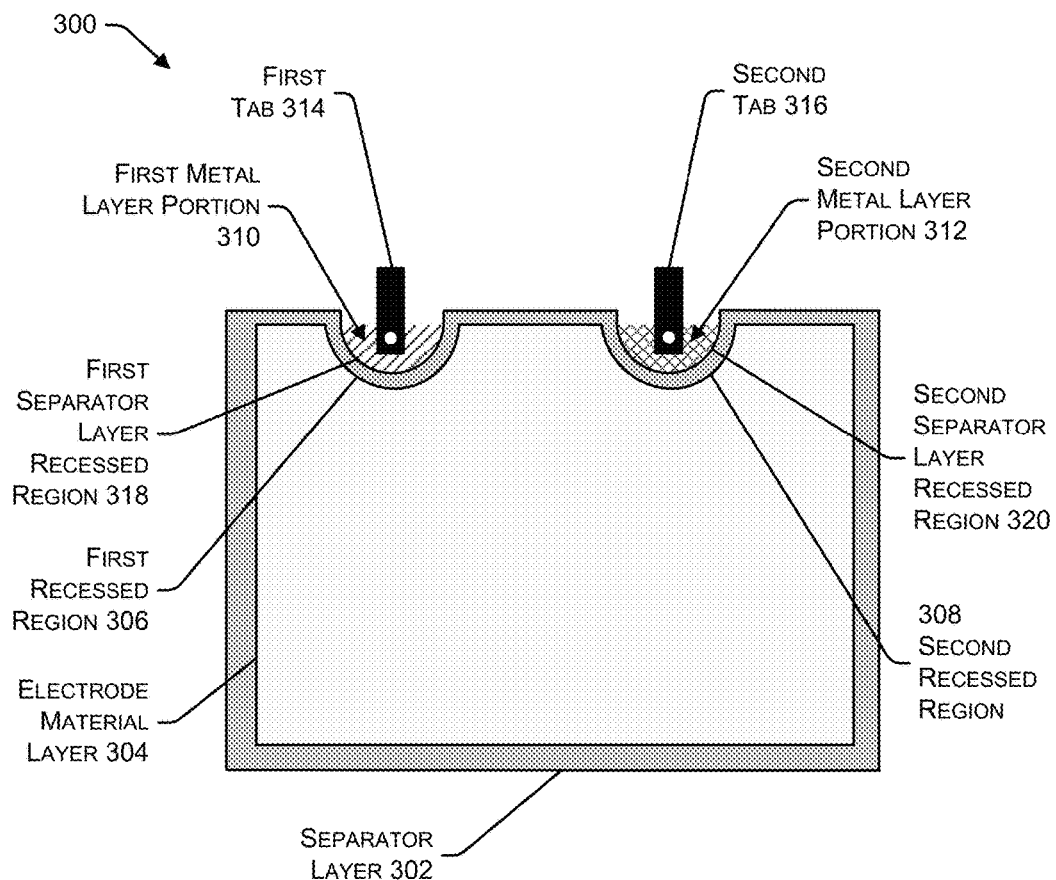
FIG. 3 illustrates a top view of an example stack of electrodes of a battery including electrodes having a plurality of recessed regions with each recessed region including an exposed portion of a different metal layer and a respective tab joined to each exposed portion.

FIG. 3 illustrates a top view of an example stack of electrodes 300 having a plurality of recessed regions with each recessed region including an exposed portion of a different metal layer and a respective tab bonded to each exposed portion. The stack of electrodes 300 includes a separator layer 302 and an electrode material layer 304. The separator layer 302 can include one or more of the materials described previously with respect to the separator layers 216, 230 of FIG. 2. In some cases, the electrode material layer 304 can include one or more materials described previously with respect to the first electrode material layer 208 and the second electrode material layer 212 of FIG. 2 or one or more materials of the third electrode material layer 222 and the fourth electrode material layer 224 of FIG. 2.

The electrode material layer 304 can include a first recessed region 306 and a second recessed region 308. The first recessed region 306 can expose a first metal layer portion 310 and the second recessed region 308 can expose a second metal layer portion 312. The second recessed region 308 can be formed by removing a portion of a first metal layer of the stack of electrodes 300 to form an opening in the second recessed region 308. This process will be described in more detail with respect to FIGS. 4-6. In an implementation, the first metal layer portion 310 can include a portion of a metal layer of a top electrode of the stack of electrodes 300 and the second metal layer portion 312 can include a portion of a metal layer of an additional electrode disposed below the top electrode of the stack of electrodes 300.

In some implementations, the stack of electrodes 300 can include alternating layers of cathodes and anodes. In one example, the first metal layer portion 310 can be included in an electrode having a first polarity and the second metal layer portion 312 can be included in an electrode having a second polarity that is different from the first polarity. Thus, in various implementations, the stack of electrodes 300 can include a plurality of electrodes of the first polarity alternating with a plurality of electrodes of the second polarity. In these situations, the stack of electrodes 300 can include electrodes of the first polarity having exposed metal layer portions at respective locations that correspond with the location of the first recessed region 306 and punch out regions with respective locations that correspond with the location of the second recessed region 308. Additionally, the stack of electrodes 300 can include electrodes of the second polarity having exposed metal layer portions at respective locations that correspond with the second recessed region 308 and punch out regions that correspond with the location of the first recessed region 306. In this way, the exposed portions of the electrodes of the first polarity can be joined via a first weld associated with the first tab 314 and the exposed portions of the electrodes of the second polarity can be joined via a second weld associated with the second tab 316.

Although the illustrated implementation of FIG. 3 shows the first recessed region 306 and the second recessed region 308 on a same side of the stack of electrodes 300, the first recessed region 306 and the second recessed region 308 can be located on different sides of the stack of electrodes 300. For example, the first recessed region 306 can be located on a first side of the stack of electrodes 300 and the second recessed region 308 can be located on a second side of the stack of electrodes 300 that is opposite the first side. In another example, the first recessed region 306 can be located on a first side of the stack of electrodes 300 and the second recessed region 308 can be located on a second side of the stack of electrodes 300 that is adjacent to the first side.

In an illustrative implementation, the electrode material layer 304 can include one or more materials of a cathode, the exposed first metal layer portion 310 can include one or more materials of a metal layer of the cathode and the exposed second metal layer portion 312 can include one or more materials of a metal layer of an anode. In another illustrative implementation, the electrode material layer 304 can include one or more materials of an anode, the exposed first metal layer portion 310 can include one or more materials of a metal layer of the anode and the exposed second metal layer portion 312 can include one or more materials of a cathode.

A first tab 314 can be bonded to the first metal layer portion 310 and a second tab 316 can be bonded to the second metal layer portion 312. In an implementation, at least one of the first tab 314 or the second tab 316 can include a metal. For example, at least one of the first tab 314 or the second tab 316 can include at least one of nickel, alloys of nickel, aluminum, alloys of aluminum, copper or alloys of copper. In some cases, the first tab 314 can be bonded to the first metal layer portion 310 via spot welding. Additionally, the second tab 316 can be bonded to the second metal layer portion 312 via spot welding.

In a particular implementation, a width or diameter of the first recessed region 306 and a width or diameter of the second recessed region 308 can have a value that is at least about 4 mm, at least about 8 mm or at least about 12 mm. In other implementations, a width or diameter of the first recessed region 306 and a width or diameter of the second recessed region 308 can have a value that is no greater than about 25 mm, no greater than about 20 mm, or no greater than about 15 mm. In an illustrative implementation, a width or diameter of the first recessed region 306 and a width or diameter of the second recessed region 308 can have a value that is included in a range of about 6 mm to about 18 mm. In some cases, a width or diameter of the first recessed region 306 can depend on a width of the first tab 314 and the second recessed region 308 can depend on a width of the second tab 316. For example, the width of the first recessed region 306 can be 2 times a width of the first tab 314, 3 times a width of the first tab 314 or 5 times a width of the first tab 314. Further, the width of the second recessed region 308 can be 2 times a width of the second tab 316, 3 times a width of the second tab 316 or 5 times a width of the second tab 316.

The separator layer 302 may have larger dimensions than the electrode material layer 304. For example, a width of the separator layer 302 can have a value that is larger than a value of a width of the electrode material layer 304. In another example, a length of the separator layer 302 can have a value that is larger than a value of a length of the electrode material layer 304. In some cases, the dimensions of the separator layer 302 can be larger than the dimensions of the electrode material layer 304 to prevent contact between an electrode material layer of an anode and an electrode material layer of a cathode. In addition, the separator layer 302 can include a first separator layer recessed region 318 that corresponds to the first recessed region 306. The first separator layer recessed region 318 can have a value of a width or diameter that is smaller than a value of a width or diameter of the first recessed region 306. Further, the separator layer 302 can include a second separator layer recessed region 320 that corresponds to the second recessed region 308. The second separator layer recessed region 320 can have a value of a width or diameter that is smaller than a value of a width or diameter of the second recessed region 308. For example, the first separator layer recessed region 318 and the second separator layer recessed region 320 can have a width or diameter of at least about 6 mm, at least about 10 mm or at least about 16 mm. In another example, the first separator layer recessed region 318 and the second separator layer recessed region 320 can have a width or diameter no greater than about 35 mm, no greater than about 30 mm, no greater than about 25 mm or no greater than about 20 mm. In an illustrative implementation, the width or diameter of the first separator layer recessed region 318 and the second separator layer recessed region 320 can have a value included in a range of about 8 mm to about 25 mm.

Figure 4:
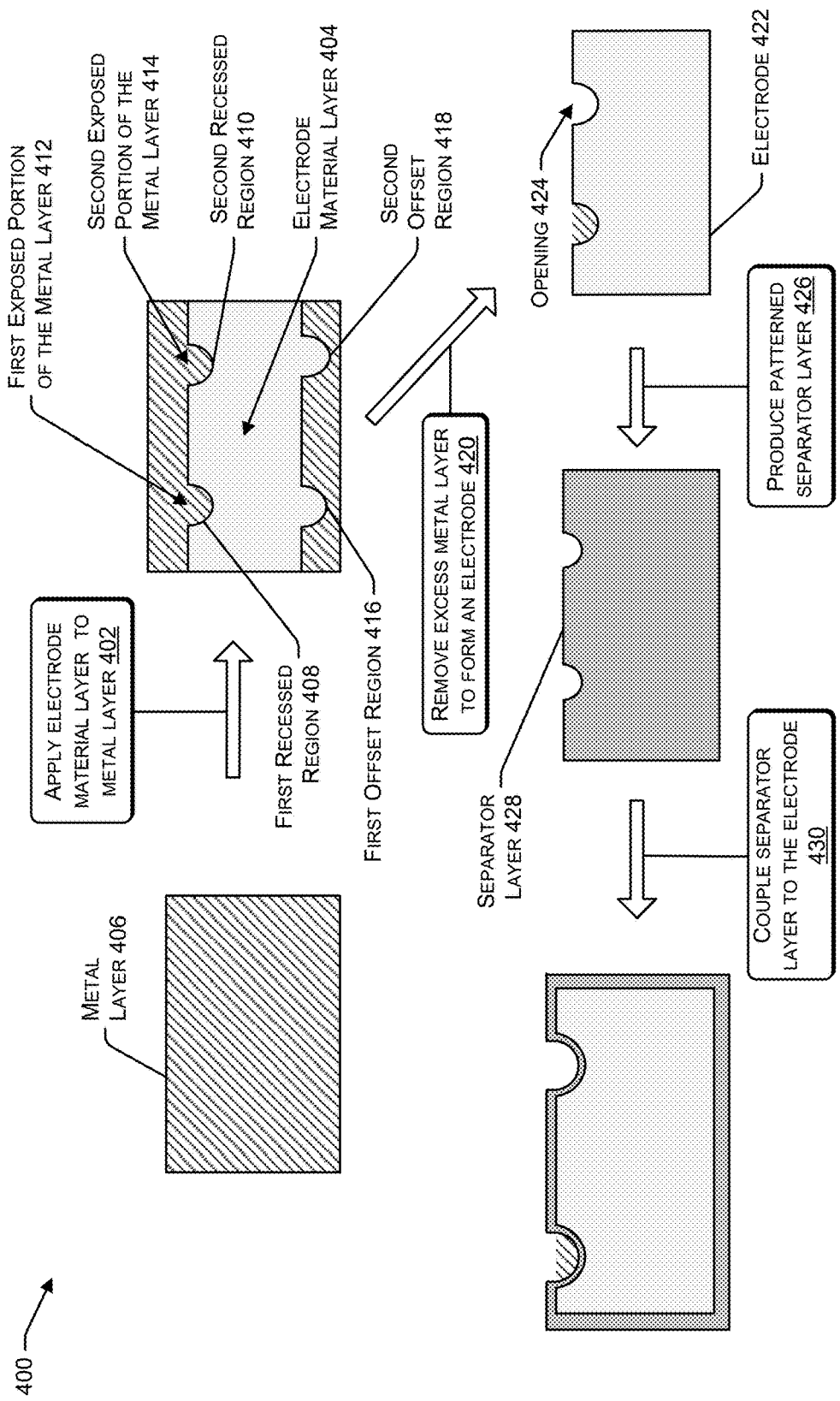
FIG. 4 illustrates a first example process to make an electrode having at least one recessed region that includes an exposed portion of a metal layer.

FIG. 4 illustrates a first example process 400 to make an electrode having at least one recessed region that includes an exposed portion of a metal layer. At 402, the process 400 includes applying or depositing an electrode material layer 404 to a metal layer 406. In some cases, the electrode material layer 404 and the metal layer 406 can include materials that are included in a cathode. In other instances, the electrode material layer 404 and the metal layer 406 can include materials that are included in an anode. The electrode material layer 404 can be applied to the metal layer 406 using a coating process. For example, the electrode material layer 404 can be applied to the metal layer 406 using a slot-die coating process.

The electrode material layer 404 can be applied to a portion of the metal layer 406. In some cases, the electrode material layer 404 can be joined to the metal layer 406 via an adhesion layer (not shown). In addition, the electrode material layer 404 can be applied to the metal layer 406 to form a first recessed region 408 of the electrode material layer 404 and a second recessed region 410 of the electrode material layer 404. The first recessed region 408 and the second recessed region 410 can be formed by shifting a device dispensing the electrode material layer 404 onto the metal layer 406. To illustrate, a head of a slot-die coating machine can be shifted for a period of time and by an amount to form the first recessed region 408 and the second recessed region 410. In another illustrative example, at least a portion of a flow of the electrode material layer 404 from a device dispensing the electrode material layer 404 onto the metal layer 406 can be blocked to form the first recessed region 408 and the second recessed region 410. By forming the first recessed region 408, a first exposed portion of the metal layer 412 is produced and by forming the second recessed region 410, a second exposed portion of the metal layer 414 is produced.

Although the illustrative implementation of FIG. 4 shows the electrode material layer 404 being applied to a first side of the metal layer 406, the process 400 can also include applying the electrode material layer 404 to a second side of the metal layer 406 that is opposite the first side of the metal layer 406. Additional respective recessed regions corresponding to the first recessed region 408 and the second recessed region 410 can be formed on the second side of the metal layer 406 using one or more alignment processes. For example, at least one of a light edge, a laser guide, or a camera can use techniques to superimpose the first recessed region 408 and the second recessed region 410 onto corresponding regions of the second side of the metal layer 406 that are aligned with the first recessed region 408 and the second recessed region 410.

A first offset region 416 and a second offset region 418 can also be produced when applying the electrode material layer 404 to the metal layer 406. The first offset region 416 and the second offset region 418 can be formed by shifting a device dispensing the electrode material layer 404 onto the metal layer 406. In other instances, the first offset region 416 and the second offset region 418 can be formed by allowing the electrode material layer 404 to overflow from portions of a device dispensing the electrode material layer 404 that correspond to the blocked regions. Before applying the electrode material layer 404 to the metal layer 406 according to a pattern that produces the first exposed portion of the metal layer 412, the second exposed portion of the metal layer 414, the first offset region 416 and the second offset region 418, a corresponding pattern of an adhesion layer can be applied to the metal layer 406.

The first offset region 416 and the second offset region 418 can provide a counter balance to the first recessed region 408 and the second recessed region 410 to aid in the production of electrodes at line speeds that are suitable for cost effective manufacture of electrodes. For example, after the electrode material layer 404 is applied to the metal layer 406, the electrode material layer 404 can be subjected to one or more drying processes and a subsequent densification process. To illustrate, after applying the electrode material layer 404 to one or more sides of the metal layer 406, the electrode can be densified through a calendering machine. In an implementation, the calendering machine can apply pressure to the electrode material layer 404 and the metal layer 406 using a number of rollers. When a layer of electrode material is also disposed on an additional side of the metal layer 406, the calendering machine can also apply pressure to the additional side of the metal layer 406 using one or more additional rollers. In an implementation, the calendering machine can apply pressure to and one or more sides the metal layer 406 of at least about 75 pounds per linear inch of material, at least about 200 pounds per linear inch of material, at least about 400 pounds per linear inch of material or at least about 600 pounds per linear inch of material. In another implementation, the calendering machine can apply pressure to and one or more sides of the metal layer 406 no greater than about 1100 pounds per linear inch of material, no greater than about 900 pounds per linear inch of material, or no greater than about 700 pounds per linear inch of material. In an illustrative implementation, the calendering machine can apply pressure to one or more sides of the metal layer 406 included in a range of about 100 pounds per linear inch of material to about 1000 pounds per linear inch of material.

By forming the first offset region 416 and the second offset region 418 of the electrode material layer 404 on the metal layer 406, the pressure applied during the densification process can be consistently maintained across the metal layer 406 and the electrode material layer 404. In some cases, a first pressure applied to the regions of the metal layer 406 and the electrode material layer 404 that include the first recessed region 408 and the second recessed region 410 can be different from a second pressure applied to the regions of the metal layer 406 and the electrode material layer 404 that include the first offset region 416 and the second offset region 418 with the first pressure and the second pressure have substantially the same magnitude. Without forming the first offset region 416 and the second offset region 418 on the metal layer 406, the pressure applied during the calendering process may have to be changed in order to prevent indentations or pressure gradient deformation in the electrode material layer 404 and/or the metal layer 406 due to the presence of the first recessed region 408 and/or the second recessed region 410. To illustrate, without forming the first offset region 416, the rollers of the calendering machine may apply a pressure at the first recessed region 408 that is different from the pressure applied at other portions of the electrode material layer 404 and/or the metal layer 406 causing indentations or pressure gradient related deformation due to stress gradients or other defects at or around the first recessed region 408. Accordingly, the line speed and load pressure during the densification process may need to be adjusted in an attempt to minimize defects and/or more expensive machinery that is able to vary the pressure applied to the electrode material layer 404 and the metal layer 406 may be used in the densification process. Thus, forming the first offset region 416 and the second offset region 418 on the metal layer 406 allows line speeds and load pressures to be maintained throughout the densification process and minimizes defects or complications produced by the calendering machine used in the densification process. As used herein, line speed can indicate a rate at which a material passes through a machine that is performing an operation on the material. For example, the electrode material layer 404 can be disposed on a roll of the metal layer 406 and the calendering machine can apply pressure to the roll of electrode material layer 404 and the metal layer 406 using one of or more rollers. Accordingly, the combined roll of electrode material layer 404 and the metal layer 406 can pass through rollers of the calendering machine at a particular line speed.

At 420, excess portions of the metal layer 406 are removed to form an electrode 422. A slitting process can be used to remove the excess portions of the metal layer 406. In an implementation, removing the excess metal layer 406 can include removing the second exposed portion of the metal layer 414. In some cases, the second exposed portion of the metal layer 414 can be removed using a punch process. In this way, an opening 424 is formed in the electrode 422 that is free of the metal layer 406 and can be used to expose a metal layer portion of an electrode having a different polarity from that of the electrode 422. For example, when the electrode 422 is a cathode, the electrode 422 can be coupled to an anode. By removing the second exposed portion of the metal layer 414, an exposed portion of the metal layer of the anode can be accessible through the opening 424 such as for bonding with a tab and/or other exposed portions of metal layers of additional anodes. In another example, the electrode 422 can include an anode and the electrode 422 can be coupled to a cathode. Thus in this situation, removing the second exposed portion of the metal layer 414, an exposed portion of the metal layer of the cathode can be accessible for bonding with a tab and/or other exposed portions of metal layers of additional cathodes.

Additionally, at 426, the process 400 includes producing a patterned separator layer 428. The pattern of the separator layer 428 can include a recessed region that corresponds to the first recessed region 408 and an additional recessed region that corresponds to the opening 424. The recessed regions of the separator layer 428 can be formed using a punch process. In an implementation, the separator layer 428 can include dimensions that have values that are larger than values for dimensions of the electrode 422 to ensure coverage of the metal layer 406 in order to prevent contact between the metal layer 406 and metal layers of additional electrodes having a different polarity from that of the electrode 422 that may be included in a battery package with the electrode 422. For example, values of a width of the separator layer 428 can be larger than values of a width of the electrode 422. In another example, values of a length of the separator layer 428 can be larger than values of a length of the electrode 422. Furthermore, a diameter of recessed regions of the separator layer 428 can be smaller than diameters of the first recessed region 408 and the second recessed region 410.

At 430, the process 400 can include coupling the separator layer 428 to the electrode 422. Although not shown in FIG. 4, in some instances, the process 400 can include coupling a tab to the first exposed portion of the metal layer 412. In an implementation, the tab can be bonded to the first exposed portion of the metal layer 412 via spot welding. In various implementations, spot welding the tab to the first exposed portion of the metal layer 412 can join exposed portions of metal layers of one or more additional electrodes to the first exposed portion of the metal layer 412 via a weld.

Figure 5:
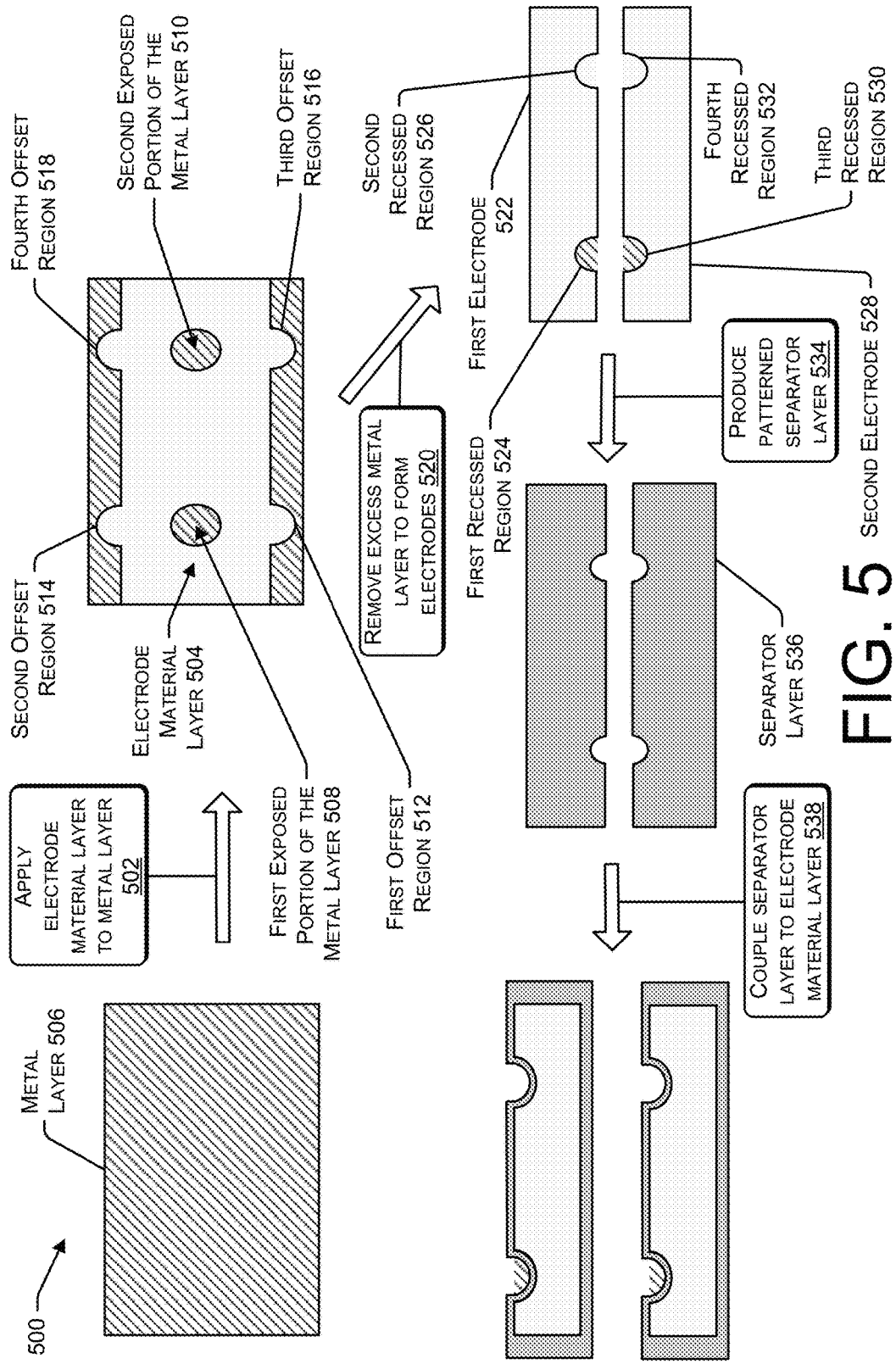
FIG. 5 illustrates a second example process to make a plurality of electrodes with each electrode having a recessed region that includes an exposed portion of a metal layer.

FIG. 5 illustrates a second example process 500 to make a plurality of electrodes with each electrode having a recessed region that includes an exposed portion of a metal layer. At 502, the process 500 includes applying an electrode material layer 504 to a metal layer 506. In some cases, the electrode material layer 504 and the metal layer 506 can include materials that are included in a cathode. In other instances, the electrode material layer 504 and the metal layer 506 can include materials that are included in an anode. The electrode material layer 504 can be applied to the metal layer 506 using a coating or deposition process. For example, the electrode material layer 504 can be applied to the metal layer 506 using a gravure coating process. In another example, the electrode material layer 504 can be applied to the metal layer 506 using a screen printing process.

The electrode material layer 504 can be applied to a portion of the metal layer 506. In some cases, the electrode material layer 504 can be joined to the metal layer 506 via an adhesion layer (not shown). In addition, the electrode material layer 504 can be applied to the metal layer 506 to form a first exposed portion of the metal layer 508 and a second exposed portion of the metal layer 510. Further, a first offset region 512 and a second offset region 514 corresponding to the first exposed portion of the metal layer 508 can be formed when the electrode material layer 504 is applied to the metal layer 506. Additionally, a third offset region 516 and a fourth offset region 518 corresponding to the second exposed portion of the metal layer 510 can be formed when the electrode material layer 504 is applied to the metal layer 506. The first exposed portion of the metal layer 508, the second exposed portion of the metal layer 510, the first offset region 512, the second offset region 514, the third offset region 516 and the fourth offset region 518 can be formed by setting the pattern within a gravure roller or within a screen printing mask. In an implementation, the first exposed portion of the metal layer 508, the second exposed portion of the metal layer 510, the first offset region 512, the second offset region 514, the third offset region 516 and the fourth offset region 518 can be formed by a device dispensing the electrode material layer 504 onto the metal layer 506 being blocked or shifted according to the pattern. As explained previously with respect to the illustrative implementation of FIG. 4, the first offset region 512, the second offset region 514, the third offset region 516 and the fourth offset region 518 can be formed to minimize defects that may be caused by applying pressure to the exposed portion of the metal layer 508 during densification of the electrode material layer 504. In some cases, the use of the pattern that includes the first exposed portion of the metal layer 508, the second exposed portion of the metal layer 510, the first offset region 512, the second offset region 514, the third offset region 516 and the fourth offset region 518 can result in even fewer defects than the pattern described in FIG. 4 because the symmetric arrangement of the first offset region 512 and the second offset region 514 around the first exposed portion of the metal layer 508 and the symmetric arrangement of the third offset region 516 and the fourth offset region 518 around the second exposed portion of the metal layer 510 causes substantially equal pressure to be applied to the electrode material layer 504 and the metal layer 506 during a calendering operation. Furthermore, before applying the electrode material layer 504 to the metal layer 506 according to a pattern that produces the first exposed portion of the metal layer 508, the second exposed portion of the metal layer 510, the first offset region 512, the second offset region 514, the third offset region 516 and the fourth offset region 518, a corresponding pattern of an adhesion layer can be applied to the metal layer 506.

Although the illustrative implementation of FIG. 5 shows the electrode material layer 504 being applied to a first side of the metal layer 506, the process 500 can also include applying the electrode material layer 504 to a second side of the metal layer 506 that is opposite the first side of the metal layer 506. A pattern formed on the second side of the metal layer 506 by the electrode material layer 504 can correspond to the pattern formed on the first side of the metal layer 506. The pattern formed on the second side of the metal layer 506 can be formed using one or more alignment processes.

At 520, excess portions of the metal layer 506 are removed to form a first electrode 522 having a first recessed region 524 and a second recessed region 526 and a second electrode 528 including a third recessed region 530 and a fourth recessed region 532. In an implementation, removal of the excess portions of the metal layer can include removing the second exposed portion of the metal layer 510 to form an opening that is included in the second recessed region 526 that is free of the metal layer 506 and an opening that is included in the fourth recessed region 532 that is free of the metal layer 506. To illustrate, the second exposed portion of the metal layer 510 can be removed using a punch process. In some cases, densification of the electrode material layer 504 can occur before removing the excess portions of the metal layer 506. In other instances, densification of the electrode material layer 504 can take place after removing the excess portions of the metal layer 506. In still other situations, portions of the second exposed portion of the metal layer 510 can be removed from the second recessed region 526 and the fourth recessed region 532 using a punch process after densification and after a slitting operation.

In an implementation, the first electrode 522 and the second electrode 528 can have the same polarity. For example, the first electrode 522 and the second electrode 528 can both be cathodes or the first electrode 522 and the second electrode 528 can both be anodes. Furthermore, in some cases, the first electrode 522 and the second electrode 528 can be included in the same stack type battery package.

At 534, the process 500 includes producing a patterned separator layer 536. The pattern of the separator layer 536 can include a first recessed region and a second recessed region that correspond to the first recessed region 524 and the second recessed region 526 of the first electrode 522 and a third recessed region and a fourth recessed region that correspond with the third recessed region 530 and the fourth recessed region 532 of the second electrode 528. In an implementation, the separator layer 536 can include dimensions that have values that are larger than values for dimensions of the first electrode 522 and the second electrode 528. At 538, the process 500 includes coupling a first portion of the separator layer 536 to the first electrode 522 and a second portion of the separator layer 536 to the second electrode 528. Although not shown in FIG. 5, in some instances, the process 500 can include coupling a tab to an exposed portion of the metal layer 508 disposed in the first recessed region 524. Additionally, the process 500 can include coupling an additional tab to the first exposed portion of the metal layer 508 disposed in the third recessed region 530.

Figure 6:
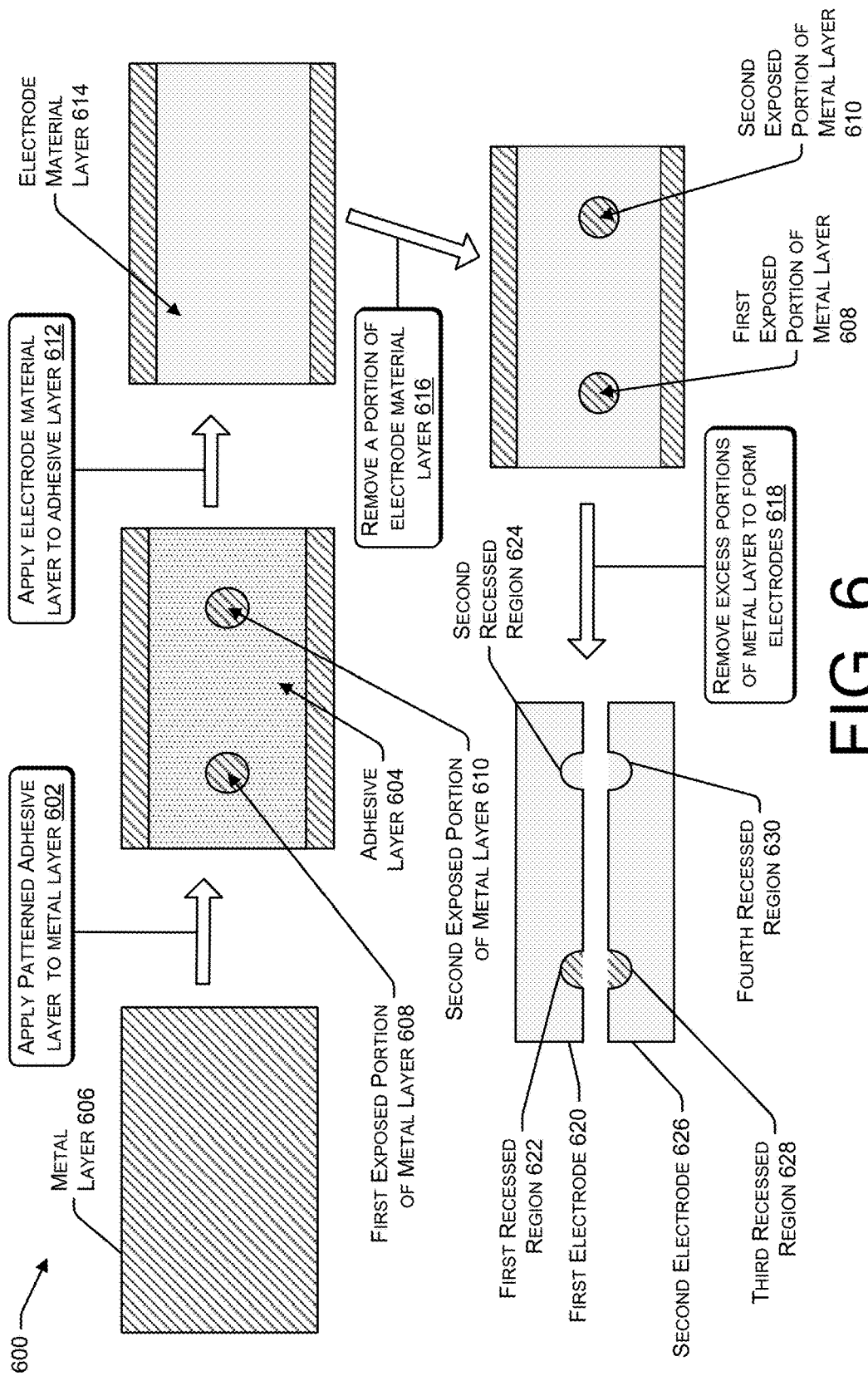
FIG. 6 illustrates a third example process to make an electrode having at least one recessed region that includes an exposed portion of a metal layer.

FIG. 6 illustrates a third example process 600 to make an electrode having at least one recessed region that includes an exposed portion of a metal layer. At 602, the process 600 includes applying a patterned adhesive layer 604 to a metal layer 606. In an implementation, the pattern of the adhesive layer 604 can form a first exposed portion of the metal layer 608 and a second exposed portion of the metal layer 610. The adhesive layer 604 can be applied to the metal layer 606 using a coating process in some implementations and a printing, coating, or deposition process in other implementations. In some scenarios, an additional adhesive layer having a pattern corresponding to the adhesive layer 604 can be applied to an additional side of the metal layer 606 that is opposite a side of the metal layer 606 joined to the adhesive layer 604.

At 612, the process 600 includes applying an electrode active material layer 614 to the adhesive layer 604. In some implementations, an electrode material layer can also be applied to a side of the metal layer 606 that is opposite the side of the metal layer 606 joined to the electrode material layer 614. Although the electrode material layer 614 may cover the first exposed portion of the metal layer 608 and the second exposed portion of the metal layer 610, the adhesion between the first exposed portion of the metal layer 608 and the second exposed portion of the metal layer 610 and the electrode material layer 614 may not be as strong as the adhesion between the adhesive layer 604 and the electrode active material layer 614. In an implementation, a densification process can be performed after applying the electrode material layer 614 to the adhesive layer 604. By conducting the densification process after applying the electrode material layer 614 to the adhesive layer 604, the pressures exerted on the metal layer 606 and the electrode material layer 614 during a calendering operation will be substantially the same across the surface area of the metal layer 606 and the electrode material layer 614. In some cases, the pressure applied to the metal layer 606 and the electrode material layer 614 during a calendering operation is substantially the same across the surface area of the metal layer 606 and the electrode material layer 614 due to the thickness of the adhesive layer 604 being no greater than about 10 microns.

At 616, the process 600 can include removing a portion of the electrode material layer 614 to reveal the first exposed portion of the metal layer 608 and the second exposed portion of the metal layer 610. In some situations, the portions of the electrode material layer 614 that correspond to the first exposed portion of the metal layer 608 and the second exposed portion of the metal layer 610 can be removed using a vacuum process. In other scenarios, the portions of the electrode material layer 614 that correspond to the first exposed portion of the metal layer 608 and the second exposed portion of the metal layer 610 can be removed using a brush. In still other instances, the portions of the electrode material layer 614 that correspond to the first exposed portion of the metal layer 608 and the second exposed portion of the metal layer 610 can be removed using an adhesive roller or pad, that is refreshed or replaced after designated use.

At 618, the process 600 includes removing excess portions of the metal layer 606 to form a first electrode 620 having a first recessed region 622 and a second recessed region 624 and a second electrode 626 having a third recessed region 628 and a fourth recessed region 630. In an implementation, the first recessed region 622 can include a first portion of the first exposed portion of the metal layer 608. Additionally, a portion of the second exposed portion of the metal layer 610 that corresponds with the second recessed region 624 can be removed during operation 618, such as using a punch process, to form an opening included in the second recessed region 624 that is free of the metal layer 606. Furthermore, the third recessed region 628 can include a second portion of the first exposed portion of the metal layer 608 while a portion of the second exposed portion of the metal layer 610 that corresponds with the fourth recessed region 630 can be removed during operation 618 to form an opening included in the fourth recessed region 630 that is free of the metal layer 606. Although formed in a different manner, the first electrode 620 and the second electrode 626 can be substantially similar to the first electrode 522 and the second electrode 528 described with respect to FIG. 5. In some situations, the process 600 can include operations described with respect to operation 534 and operation 538 of FIG. 5. For example the process 600 can include producing patterned separator layers that correspond to the first electrode 620 and the second electrode 626 and coupling the respective separator layers to the electrode material layer of the first electrode 620 and the electrode material layer of the second electrode 626. Additionally, in some situations, the process 600 can include bonding a first tab to the portion of the first exposed portion of the metal layer 608 included in the first recessed region 622 and bonding a second tab to the portion of the first exposed portion of the metal layer 608 included in the third recessed region 628.

Figure 7:
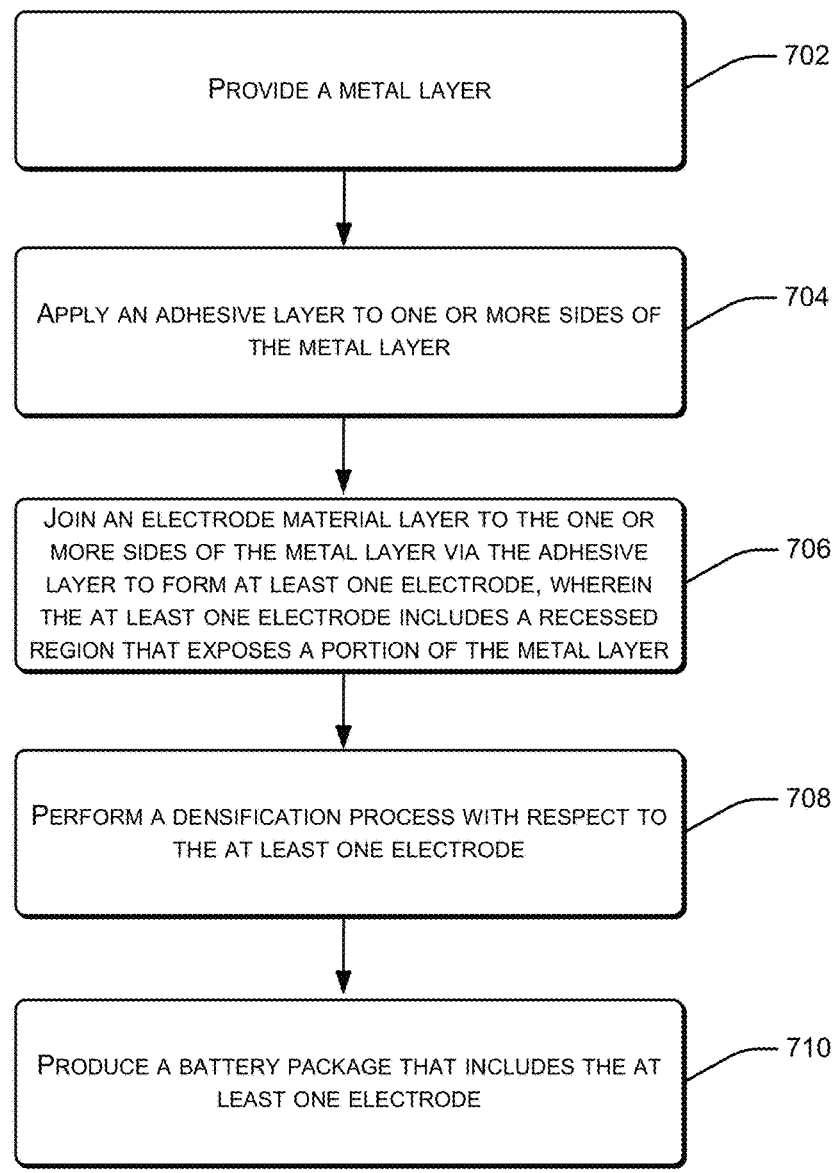
FIG. 7 illustrates a flow diagram of an example process to make an electrode having a recessed region with an exposed metal layer.

FIG. 7 illustrates a flow diagram of an example process 700 to make an electrode having a recessed region with an exposed metal layer. The processes are illustrated as a collection of blocks in a logical flow diagram, which represent a sequence of operations. The order in which the operations are described should not be construed as a limitation. Any number of the described blocks can be combined in any order and/or in parallel to implement the process, or alternative processes, and not all of the operations of the blocks need to be performed. For discussion purposes, the processes herein are described with reference to the frameworks and devices described in implementations herein, although the processes may be implemented with respect to a wide variety of other frameworks and devices.

At 702, the process 700 includes providing a metal layer. The metal layer can be suitable for producing an electrode. The metal layer can include at least one of aluminum, alloys of aluminum, nickel, alloys of nickel, copper or alloys of copper. In some cases, the metal layer can be provided as a sheet of material or rolls of material. For example, sheets of material can be used in a batch-to-batch process, while rolls of material can be used in a roll-to-roll process.

At 704, the process 700 includes applying an adhesive layer to the metal layer. The adhesive layer can be applied to the metal layer using a coating process, deposition, or a printing process. In some implementation, the adhesive layer can be applied to the metal layer in a pattern. For example, the adhesive layer can be applied to the metal layer such that a portion of the metal layer is free of the adhesive layer and the portion of the metal layer is exposed.

At 706, the process 700 includes joining an electrode material layer to the metal layer via the adhesive layer to form at least one electrode. The electrode material layer can be disposed on the metal layer such that a recessed region of the electrode material layer is produced. In some cases, the recessed region can be produced by patterning the electrode active material layer on the metal layer. In an implementation, the pattern of the electrode material layer can correspond with a pattern of the adhesive layer. In other situations, the electrode material layer can be applied over a region of the metal layer that is free of the adhesive layer. In these instances, the recessed region can be produced by removing the electrode active material layer from the region of the metal layer that is free of the adhesive layer, such as via at least one of a brush operation, a rolling operation or a vacuum operation. The electrode active material can be removed from the region of the metal layer that is free of the adhesive layer after a densification process.

In some implementations, the pattern of the electrode material layer can include one or more offset regions in addition to the recessed region. In a particular implementation, the recessed region is formed by a pattern where the electrode material layer is absent from a location of the recessed region, while the one or more offset regions are formed by applying the electrode material layer to one or more respective locations that correspond to the offset regions. In an illustrative implementation, the one or more offset regions can be placed in a location that corresponds to a location of the recessed region. In one example, the location of the one or more offset regions can be along a same axis as the recessed region. To illustrate, X-direction coordinates for the one or more offset regions can be substantially the same as X-direction coordinates for the recessed region. Additionally, an area of the one or more offset regions can correspond with an area of the recessed region. For example, dimensions of the one or more offset regions alone or in combination with each other can match the dimensions of the recessed region. In some instances, when a single offset region is formed on the metal layer, the dimensions of the single offset region, such as length, width, radius, diameter, can be substantially the same as the dimensions of the recessed region. In other scenarios, when multiple offset regions are formed on the metal layer a combination of the areas of the multiple offset regions can be substantially equal to the area of the recessed region.

In a particular implementation, a first offset region can have an area that corresponds with one-half of the area of the recessed region, while a second offset region can have an area that corresponds with a second half of the area of the recessed region. Furthermore, the offset regions can have a geometric shape that corresponds with a geometric shape of the recessed regions. To illustrate, an offset region can have a substantially circular shape when a recessed region has a substantially circular shape. In another illustrative example, an offset region can have a substantially rectangular shape when a recessed region has a substantially rectangular shape.

The adhesive layer and/or the electrode material layers can be applied to one or more sides of the metal layer of the at least one electrode using one or more procedures. For example, the adhesive layer and/or the electrode material layer can be applied to one or more sides of the metal layer using roll-to-roll (R2R) coating, continuous patch coating, slot die coating, gravure coating, reverse gravure coating, offset gravure coating, 3-roll coating, knife-over coating, screen-printing, ink jet printing, dot-matrix printing, tape-casting, meniscus coating, spray coating, rod coating, or any other suitable method or combinations thereof. In some implementations, some or all of these methods may be modified to include vibrations, coating head off-sets or shifts, air-knives or shims, frames that block or allow appropriate pattern transfer and the like to produce the recessed regions and offset regions of the electrode material layer formed on one or more sides of the metal layer.

At 708, the process 700 includes performing a densification process with respect to the at least one electrode. The densification process can include one or more drying operations for the electrode material layer. The densification process can also include a calendering process where the at least one electrode is subjected to pressure via one or more rollers. In an implementation, the calendering process can be performed by applying pressures to the at least one electrode included in a range of about 100 pounds per linear inch of material to about 1000 pounds per linear inch of material. The pressures applied during the calendering process can be maintained for a period of time as electrode material passes through the calendering machine. For example, in situations where the electrode material passing through the calendering machine includes one or more exposed metal layer portions, the pressures applied are maintained across the surface of the electrode material. To illustrate, in some cases, electrode material passing through the calendering machine can include one or more offset regions to aid in maintaining the pressure being applied to the electrode material.

Additionally, the calendering process can take place at line speeds of at least about 2 feet per minute, at least about 25 feet per minute or at least about 50 feet per minute. In other implementations, the calendering process can take place at lines speeds no greater than about 125 feet per minute, no greater than about 100 feet per minute or no greater than about 75 feet per minute. In an illustrative implementation, the calendering process can take place at lines speeds included in a range of about 0.5 feet per minute to about 100 feet per minute. In some cases, the pressures applied during the calendering process may depend on the line speed. For example, the pressures applied during the calendering process may increase as the line speed decreases. In another example, the pressures applied during the calendering process may decrease as the line speed decreases.

In some cases, the densification process can be performed after a slitting operation is performed. In other cases, the densification process can be performed before the slitting operation is performed. The slitting operation can remove portions of the metal layer to form the at least one electrode.

At 710, the process 700 includes producing a battery package that includes the at least one electrode. In some cases, the at least one electrode can be included in a stack of electrodes that is included in the battery package. In other cases, the at least one electrode can be formed on a roll that includes a plurality of electrodes that is to be used in a winding type battery package. For example, the at least one electrode can be included in a roll of anodes or a roll of cathodes. In an illustrative implementation, the at least one electrode can include a cathode in the form of a roll of cathode electrodes and the exposed portions of the metal layer of the at least one electrode can be positioned on the roll in such a way that the exposed portion of the metal layer of the at least one electrode is aligned with the exposed portions of metal layers of other cathodes included in the roll when arranged to form a winding type battery package. Continuing with this example, the at least one electrode can also include a recessed region having the metal layer removed, such as in a punch process. In these situations, the punched through portion of the at least one electrode can be positioned on the roll to align with punched through portions of additional cathodes from a roll of cathode electrodes when the roll of cathodes electrodes is arranged to form a winding type battery package. Additionally, the punched through portions of the cathodes of a winding type battery package can correspond with the exposed metal layer portions of anodes included in a roll of anode electrodes of the winding type battery package and the anodes can include punched through areas that correspond with the exposed metal layer portions of the cathodes in the roll of cathode electrodes of the winding type battery package. Furthermore, one or more separator layers that are disposed between one or more electrode material layers of the roll of anode electrodes and one or more electrode material layers of the roll of cathode electrodes can also include a pattern that corresponds to the exposed metal layer portions of the electrodes of the roll of anode electrodes and that corresponds to the exposed metal layer portions of the electrodes of the roll of cathode electrodes.

Additionally, producing the battery package can include coupling the exposed portion of the metal layer of the at least one electrode with a tab. In some cases, the tab can include a metal. For example, the tab can include at least one of nickel, alloys of nickel, aluminum, alloys of aluminum, copper or alloys of copper. In an implementation, the tab can be joined to the exposed portion of the metal layer using a welding process, such as spot welding or laser welding. In some situations, welding the tab to the exposed portion of the metal layer can join exposed portions of additional metal layers together. To illustrate, welding the tab to the exposed portion of the metal layer can form a weld between exposed portions of additional metal layers, where the weld is formed from a part of each of the exposed portions of the additional metal layers. The tab can serve as an external contact to provide power to components of an electronic device that includes a battery having the at least one electrode. In various implementations, a tab can be bonded directly to the exposed portion of a single metal layer included in a battery package while being electrically coupled to additional exposed portions of metal layers of electrodes of the battery package through a weld.

The battery package can be produced by enclosing the at least one electrode in a packaging material. Additionally, the tab coupled to the exposed portion of the metal layer can extend beyond a periphery of the battery package. In these situations, a sealing material can be used to form a seal at the location of the battery package where the tab extends beyond the periphery of the battery package. In this way, the battery within the battery package can be protected from contamination. In a particular implementation, the battery package can be hermetically sealed.

Figure 8:
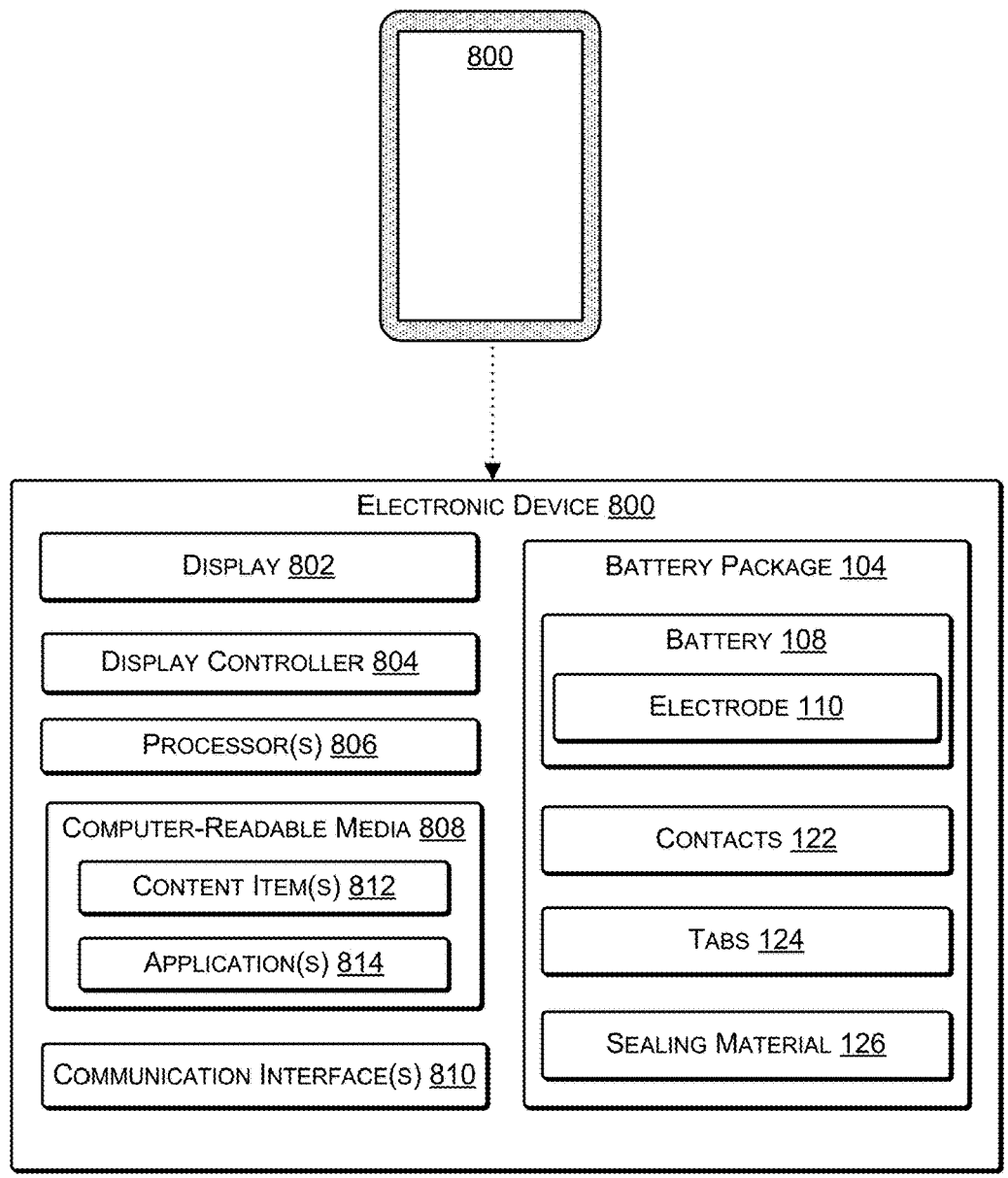
FIG. 8 illustrates an example electronic device having a battery package that includes an electrode with a recessed region, where the recessed region includes an exposed portion of a metal layer that is used to form a contact lead.

FIG. 8 illustrates an example electronic device 800 having a battery package that includes an electrode with a recessed region, where the recessed region includes an exposed portion of a metal layer that is used to form a contact lead. The electronic device 800 can include any type of electronic device. For instance, the electronic device 800 can be a mobile electronic device, such as an electronic book reader, a tablet computing device, a laptop computer, a smart phone or other multifunction communication device, a portable digital assistant, a media player, a wearable computing device, an automotive display, combinations thereof, and the like. Alternatively, the electronic device 800 may be a non-mobile electronic device, such as a computer display, a desktop computing device, a television, a household appliance, industrial equipment, combinations thereof, and so forth. In addition, while FIG. 8 illustrates several example components of the electronic device 800, it is to be appreciated that the device 800 can also include other components, such as an operating system, system busses, input/output components, and the like. Further, in other examples, such as in the case of a television or computer monitor, the electronic device 800 can include a subset of the components shown.

Regardless of the specific implementation of the electronic device 800, the electronic device 800 includes the display 802 and a corresponding display controller 804. The display 802 can include a reflective display, such as an electronic paper display, a reflective liquid crystal display (LCD), or the like. Some examples of the display 802 that can be used with the implementations described herein include bi-stable LCDs, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of electronic devices 800, the display 802 can include an active display such as a liquid crystal display, a plasma display, a light emitting diode display, an organic light emitting diode display, and so forth. Accordingly, implementations herein are not limited to any particular display technology.

The electronic device 800 can include one or more hardware processors 806 and one or more computer-readable media 808 and one or more communication interfaces 810. The communication interfaces 810 can support both wired and wireless connection to various networks, such as cellular networks, radio, WiFi networks, short range networks (e.g., Bluetooth®), infrared (IR), and so forth.

Depending on the configuration of the electronic device 800, the computer-readable media 808 (and other computer-readable media described throughout) is an example of computer storage media and can include volatile and non-volatile memory. Thus, the computer-readable media 808 can include, but is not limited to, RAM, ROM, EEPROM, flash memory, or other memory technology, or any other medium that can be used to store computer-readable instructions, programs, applications, media items, and/or data which can be accessed by the electronic device 800. In some examples, the computer-readable media is a tangible non-transitory computer-readable media.

The computer-readable media 808 can be used to store any number of functional components that are executable on the processor 806, as well as content items 812 and applications 814. Thus, the computer-readable media 808 can include an operating system and a storage database to store one or more of the content items 812, such as eBooks, audio books, songs, videos, still images, and the like. The computer-readable media 808 of the electronic device 800 can also store one or more content presentation applications to render some of the content items 812 on the electronic device 800 via the display 802. These content presentation applications may be implemented as various applications 814 depending upon the content items 812 being rendered. For instance, a content presentation application can include an electronic book reader application for rendering textual electronic books. In other cases, the applications 814 can include an audio player for playing audio books or songs, a video player for playing video, and so forth.

The electronic device 800 can also include one or more power sources, such as the battery package 104. The battery package 104 can include a battery 108 having one or more electrodes, such as the electrode 110. The battery package 104 can also include one or more contacts 122, one or more tabs 124 and one or more sealing materials 126. The components of the battery package 104 are described in more detail with respect to FIG. 1.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

What is claimed is:

1. A device comprising:
a housing;
a battery package disposed in the housing and including:
an electrode having at least a first side and a second side that come together to form a corner, the electrode including:
a conductive layer; and
an electrode material layer disposed on the conductive layer, wherein:
a first recessed region of the electrode material layer exposes a portion of the conductive layer to form an exposed portion of the conductive layer;
a second recessed region of the electrode material layer includes an opening that is free of the conductive layer and the electrode material layer; and
the first recessed region and the second recessed region are both disposed within the first side of the electrode; and
a tab coupled to the exposed portion of the conductive layer, the tab extending outside of the battery package and forming an external contact to electronic components of the device.

2. The device of claim 1, wherein a thickness of the battery package is no greater than about 2 mm, a width of the battery package is no greater than about 100 mm, and a length of the battery package is no greater than about 150 mm.

3. The device of claim 1, wherein the electrode material layer is a first electrode material layer joined to a first side of the conductive layer by a first adhesion layer, and a second electrode material layer is joined to a second side of the conductive layer by a second adhesion layer, the second side being opposite to the first side.

4. The device of claim 1, wherein:
the electrode is a first anode of a plurality of anodes; and
the battery package includes a second anode of the plurality of anodes and a weld coupling the exposed portion to an additional exposed portion of the second anode.

5. The device of claim 1, wherein:
the electrode includes a first cathode of a plurality of cathodes; and
the battery package includes a second cathode of the plurality of cathodes and a weld coupling the exposed portion to an additional exposed portion of the second cathode.

6. The device of claim 1, wherein the electrode is included in a stack of electrodes, the stack of electrodes includes a plurality of anodes and a plurality of cathodes, and individual anodes of the plurality of anodes are disposed adjacent to at least one cathode of the plurality of cathodes.

7. The device of claim 1, wherein:
the electrode is a cathode, the conductive layer is a first conductive layer, the exposed portion of the conductive layer is a first exposed portion, and the electrode material layer is a first electrode material layer; and
the battery package further includes:
an anode having:
a second conductive layer; and
a second electrode material layer, the second electrode material layer being disposed on the second conductive layer and includes a third recessed region, wherein the third recessed region exposes a portion of the second conductive layer to form a second exposed portion; and
an additional tab coupled to the second exposed portion, the additional tab forming an additional external contact to the electronic components of the device.

8. The device of claim 7, wherein a location of the second recessed region on the cathode corresponds with a location of the third recessed region on the anode.

9. The device of claim 8, wherein at least one of a width of the first recessed region, a width of the second recessed region, or a width of the third recessed region have a value included in a range of about 6 mm to about 18 mm.

10. An electronic device comprising:
a housing;
one or more processors disposed in the housing;
memory disposed in the housing; and
a battery package disposed in the housing and including:
a first electrode having at least a first side and a second side that come together to form a corner and having a first polarity, the first electrode including:
a first metal layer;
a first adhesive layer disposed on the first metal layer; and
a first electrode material layer disposed on the first adhesive layer and joined to the first metal layer via the first adhesive layer, the first electrode material layer having a first recessed region that exposes a portion of the first metal layer to form a first exposed portion and a first additional recessed region including a first opening that is free of the first metal layer, wherein the first recessed region and the first additional recessed region are disposed within the first side of the first electrode and the first recessed region has first dimensions;
a tab coupled to the first exposed portion such that the tab directly contacts the first exposed portion, wherein the tab extends outside of the battery package to provide power to at least one of the one or more processors, the memory, or one or more display devices;
a second electrode disposed below the first electrode and having a second polarity different from the first polarity, the second electrode including:
a second metal layer;
a second adhesive layer disposed on the second metal layer; and
a second electrode material layer disposed on the second adhesive layer and joined to the second metal layer via the second adhesive layer, the second electrode material layer having a second recessed region that exposes a portion of the second metal layer to form a second exposed portion and the second recessed region having second dimensions that are substantially the same as the first dimensions; and
a separator layer disposed between the first electrode and the second electrode.

11. The electronic device of claim 10, wherein the second electrode material layer has a second additional recessed region including a second opening that is free of the second metal layer.

12. The electronic device of claim 10, wherein the battery package includes a third electrode having the first polarity and including a third electrode material layer having a third recessed region that exposes a portion of a third metal layer to form a third exposed portion, and the battery package further comprising:
a weld coupling the tab to the third exposed portion and the first exposed portion.

13. The electronic device of claim 12, wherein the battery package includes:
a packaging material that encloses the first electrode, the second electrode, the third electrode, the separator layer, and the weld;
a sealing material that couples a first portion of the tab to the packaging material; and
wherein a second portion of the tab extends outside of the packaging material.

14. A computing device comprising:
a housing;
one or more processors disposed in the housing;
memory disposed in the housing; and
a battery package to provide power to the one or more processors and the memory, the battery package disposed in the housing and including:
a first electrode having a first side and a second side that come together to form a corner, the first electrode including a first conductive layer and a first electrode material layer disposed on the first conductive layer, wherein:
the first electrode includes a first recessed region of the first electrode material layer that exposes a portion of the first conductive layer;
the first electrode includes a second recessed region of the first electrode material layer that includes an opening that is free of the first conductive layer and the first electrode material layer; and
the first recessed region and the second recessed region are disposed within the first side of the first electrode;
a second electrode having a second conductive layer and a second electrode material layer disposed on the second conductive layer, wherein:
the second electrode includes a third recessed region of the second electrode material layer that exposes a portion of the second conductive layer; and
a location of the second recessed region on the first electrode corresponds with a location of the third recessed region on the second electrode;
a separator layer disposed between the first electrode and the second electrode, wherein:
the separator layer includes a first additional recessed region that corresponds to the first recessed region and a second additional recessed region that corresponds to the second recessed region;
a first tab coupled to the portion of the first conductive layer exposed by the first recessed region, a first portion of the first tab extending outside of the battery package; and a second tab coupled to the portion of the second conductive layer exposed by the third recessed region, a second portion of the second tab extending outside of the battery package.

15. The computing device of claim 14, wherein the first electrode has a first polarity and the second electrode has a second polarity that is different from the first polarity, and the device further comprises:
   a plurality of additional first electrodes coupled to the first electrode via a first weld; and
   a plurality of additional second electrodes coupled to the second electrode via a second weld.

16. The computing device of claim 14, wherein:
   the first electrode includes a cathode and the first conductive layer includes at least one of aluminum, nickel, an alloy of aluminum, or an alloy of nickel; and
   the second electrode includes an anode and the second conductive layer includes at least one of copper or an alloy of copper.

17. The computing device of claim 14, wherein:
   the second electrode includes a fourth recessed region that includes an additional opening free of the second conductive layer and free of the second electrode material layer.

18. The computing device of claim 14, wherein:
   the first electrode further comprises an adhesive layer disposed between the first conductive layer and the first electrode material layer; and
   the adhesive layer includes a conductive component that comprises at least one of carbon black, graphite, carbon nanotubes, or graphene and a binder that comprises a polyimide-based material.

19. The computing device of claim 14, wherein the first electrode material layer includes:
   a binder that includes at least one of poly(acrylic acid), polyethylene oxide, poly(vinyl alcohol), poly(vinylidene fluoride), carboxymethyl cellulose, polyvinyl pyrrolidone, polytetrafluoroethylene, or a styrene-butadiene co-polymer, and
   an active material that includes a host material for lithium ions.

20. The computing device of claim 14, wherein the separator layer comprises at least one of a polyethylene or a polypropylene and the separator layer is permeable to lithium ions.

* * * * *